US007013291B1

(12) United States Patent
Green

(10) Patent No.: US 7,013,291 B1
(45) Date of Patent: Mar. 14, 2006

(54) FINANCIAL INSTRUMENT FILTERING SYSTEM AND METHOD THEREFOR

(76) Inventor: Paul T. Green, 3 Baywood La., Westport, CT (US) 06880

(*) Notice: Subject to any disclaimer, the term of this patent is extended or adjusted under 35 U.S.C. 154(b) by 0 days.

(21) Appl. No.: 09/389,939

(22) Filed: Sep. 3, 1999

Related U.S. Application Data

(60) Provisional application No. 60/099,272, filed on Sep. 4, 1998.

(51) Int. Cl.
*G06F 17/60* (2006.01)

(52) U.S. Cl. .......................................... 705/31; 705/27
(58) Field of Classification Search ................. 703/35, 703/36; 705/31, 27
See application file for complete search history.

(56) References Cited

U.S. PATENT DOCUMENTS

| 4,221,003 | A | * | 9/1980 | Chang et al. ............... 707/100 |
| 5,220,500 | A | * | 6/1993 | Baird et al. ................. 364/408 |
| 5,590,325 | A | * | 12/1996 | Kolton et al. ............... 395/615 |
| 5,774,878 | A | * | 6/1998 | Marshall ...................... 705/35 |
| 5,784,696 | A | | 7/1998 | Melnikoff |
| 5,799,287 | A | | 8/1998 | Dembo |
| 5,918,217 | A | * | 6/1999 | Maggioncalda et al. ...... 705/36 |
| 5,930,774 | A | | 7/1999 | Chennault |
| 5,946,666 | A | | 8/1999 | Nevo et al. |
| 6,212,526 | B1 | * | 4/2001 | Chaudhuri et al. ......... 707/102 |
| 6,223,171 | B1 | * | 4/2001 | Chaudhuri et al. ............ 707/2 |

FOREIGN PATENT DOCUMENTS

EP 996886 * 7/1998

OTHER PUBLICATIONS

Histograom, The Data Analysis Briefbook, 2 pages downloaded from the Internet at http://rkb.home.cem.ch/rkb/title-A.html, last accessed Apr. 4, 2004.*
White, Ron, How Computers Work, Millenium Ed. Que Corporation, Sep. 1999.*
Mathworks.com, dated Feb. 9, 1999.*
"A New Gold Medalist in Fund Software," by Robert Barker, Business Week, Feb. 23, 1998, pp. 130.
"The Vanguard Retirement Planner".

* cited by examiner

*Primary Examiner*—Michael Cuff
(74) *Attorney, Agent, or Firm*—Ohlandt, Greeley, Ruggiero & Perle, L.L.P.

(57) ABSTRACT

A user interactive apparatus for searching a universe of financial instruments such as stocks, bonds, funds and the like. The search is conducted with a filtering process that involves performing n filter passes of the universe with a computer system having a viewing screen, an input device and an investment selection program. The filter condition for each filter is from a plurality of parameter limiters and a plurality of investment parameters. The pluralities of criteria and of parameters are presented in one area of the viewing screen. The program enables a user to select the filter condition for the $i^{th}$ filter pass from the displayed criteria and parameters by operation of the input device. A histogram is then displayed in a second area of the viewing screen as an aid to the user in making filter condition selections. The histogram shows the population of financial instruments in different frequency of occurrence categories for the user selections. The $i^{th}$ filter pass is execute d upon a command provided in response to user operation of the input device. The process is repeated until the $n^{th}$ filter pass has been performed.

16 Claims, 26 Drawing Sheets

FINANCIAL INSTRUMENT FILTERING SYSTEM AND METHOD THEREFOR

This application claims priority to U.S. Provisional Application No. 60/099,272, filed on Sep. 4, 1998.

FIELD OF INVENTION

This invention relates to a system, memory media and a method for searching through a universe of information related to financial instruments. The information includes data pertaining to stocks, bonds, mutual funds, options, futures, insurance or other financial products. In particular, the invention facilitates rapid, systematic selection of filter conditions, and a corresponding sequence of one or more filter passes through the universe to narrow the items of interest to a manageable number. The system according to the present invention includes a computer with a program which, among other things, prompts the user graphically to aid in the selection of filter pass criteria.

BACKGROUND OF INVENTION

Investment selection has become increasingly complex due to ever larger numbers of security types and financial instruments on the one hand and an expanding number of investment parameters or data fields that are offered by information sellers, especially electronic information sellers, on the other hand. For example, more than 100 data categories for each of 9,000 mutual funds are tracked by the Morningstar Principia software product available from Morningstar, Inc. Another service, the Value Line Mutual Fund Survey, available from Value Line, Inc., covers more than 150 data categories for more than 8,200 mutual funds.

Using such software systems to select a manageable number of funds for detailed analysis involves making a sequence of filter passes to reduce the size of the universe until that manageable number is reached. The process is inherently difficult because the spread sheets are so large. The user must first scroll horizontally to identify those data fields of interest, with considerable risk of confusion and error. Then filter criteria have to be specified by what amounts to cut and try methods since the data fields are much too long to indicate to the naked eye the range and distribution of values therein. Also, in these products, the user must effectively change display screens, obscuring the spreadsheet screen in favor of a filter criteria screen. To reaccess the spread sheet after a filter pass, the filter conditions must be removed from view. To maintain orientation the user is forced to an awkward process of switching back and forth between the spreadsheet screen and filter criteria screen.

These products are not easy to use. Using them well requires much training and skill. Even then the procedures are likely to be time-consuming for most operators. What is needed is a system that is easy to access for the rapid selection of filter conditions.

The present invention provides such a system. It presents investment parameters and parameter limiters in a manner that allows a user to rapidly establish a filter condition for a filter pass through the data.

The present invention also provides a method of conducting a search of a universe of financial instruments by visually presenting a population graphic showing the population of the financial instruments in different distribution categories as an aid for filter condition selection

SUMMARY OF INVENTION

The present invention involves an user interactive apparatus that conducts a search of a universe of financial instruments. The search includes the performance of n filter passes of the universe of financial instruments. Each filter pass is based on at least one of a plurality of filter criteria.

The apparatus includes a computer system that includes a processor, a memory, a memory access device, a viewing screen, a computer input device and a security search procedure. The security search procedure configures the computer system to perform the filter passes according to user designated filtering. Prior to an ith filter pass, the plurality of filter criteria are presented on the viewing screen, where i is an integer from 1 to n. User selection by operation of the computer input device of at least one of the filter investment criteria establishes a proposed filter condition for the ith filter pass. A population distribution graphic for the selected proposed filter condition is presented on the viewing screen. The population distribution graphic shows the population of financial instruments in different frequency of occurrence categories for the selected proposed filter condition. By visual inspection of the graphic, the user can rapidly select one or more of the filter investment criteria for the next or ith filter pass. In preferred embodiments, the population distribution graphic is a histogram.

The security search procedure also enables the simultaneous presentation on the viewing screen of the population distribution graphic and the plurality of filter investment criteria from which the user may compose a filter condition. In a preferred embodiment, the viewing screen is split into a first display area and a second display area. The plurality of filter investment criteria is displayed in the first area. The histogram is displayed in the second area. The filter investment criteria are selectable by user operation of the computer input device to select a proposed filter condition. The security search procedure responds to a user selected proposed filter condition to display a histogram therefor. This permits the user to quickly ascertain whether the proposed filter condition is a desired one.

In one embodiment, the user can select a limiter from a plurality of limiters presented on the viewing screen to limit an investment parameter In an alternate embodiment a shortcut selection technique comprises selection of a limiter actuator presented on the viewing screen in association with one or more of the display elements of the histogram. The limiter actuator, for example, is assigned the limiter that the user is expected to choose for the selected investment parameter.

The method according to the present invention conducts a search of a universe of financial instruments that includes the performance of n filter passes of the universe with a computer system having a processor, a memory, a memory access device, a viewing screen and a computer input device. Each filter pass has a filter condition that is selected from a plurality of filter investment criteria for the financial instruments. The method comprises:

configuring the processor, the memory, the memory access device, the viewing screen and the computer input device to conduct the search;

presenting on the viewing screen the plurality of filter investment parameters, the parameters being selectable by user operation of the computer input device;

presenting on the viewing screen a histogram showing the population of the financial instruments in different frequency categories for a proposed filter condition of an $i^{th}$ one of the filter passes, where i is an integer from 1 to n;

executing said ith filter pass in response to a run command generated by user operation of the computer input device; and repeating the foregoing operations until the $n^{th}$ filter pass has been performed.

A memory media according to the present invention comprises:

(a) means for configuring the computer system into a filter for performing the filter passes;

(b) means for controlling the filter to present on the viewing screen a plurality of filter investment that are selectable by user operation of the computer input device;

(c) means for controlling the filter to present on the viewing screen a histogram showing the population of the financial instruments in different frequency of occurrence categories for a proposed filter condition of an $i^{th}$ one of the filter passes;

(d) means for controlling the filter to execute the proposed or $i^{th}$ filter pass in response to a run command generated by user operation of the computer input device;

(e) means for causing means (b), means (c) and means (d) to repeat until the $n^{th}$ filter pass has been performed; and (e) optional means for combining the n filter passes with an investment category filter.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENTS

The system and method of the present invention can be used for selection of a variety of financial instruments, such as stocks, bonds, mutual funds, options, futures, insurance and other financial products. By way of example, a preferred embodiment of the invention will be described herein for mutual fund applications.

Figure 1:
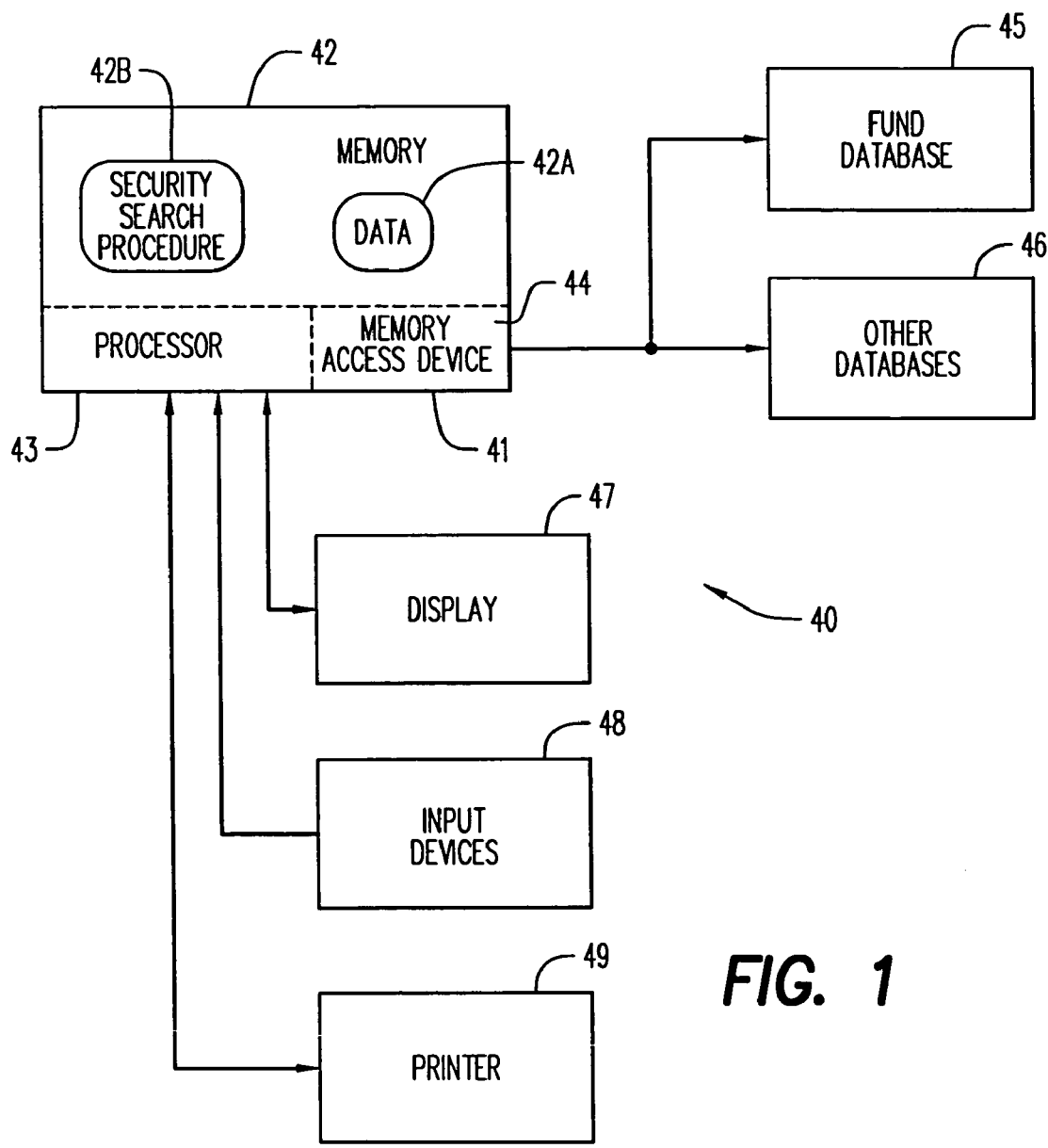
FIG. 1 is a block diagram of a finnancial instrument filtering system according to the present invention.

With reference to FIG. 1, there is provided a system 40 for selecting a manageable number of financial instruments from a universe of such instruments. System 40 is a computer system that includes a computer 41, a display 47, a computer input device 48 and a printer 49. Computer 41 includes a memory 42, a processor 43 and a memory access device 44. Memory 42 includes a data portion 42A and a control portion that includes a security search procedure 42B.

Memory access device 44 is operable to fetch program or control instructions from memory 42, to fetch data from memory data portion 42A for processor 43 and to perform operations on the data as directed by the program instructions.

Security search procedure 42B is operable to configure computer system 41 into a filter that performs filter passes of a mutual fund data base. The filter operates on the mutual fund data base that can be accessed by memory access device 44 locally from memory data portion 42A or remotely via a communication medium (for example, the public telephone network, the internet, or other communication facility) from a mutual fund data base 45 or other data bases 46. A communications facility (not shown) enables communication with data bases 45 and/or 46.

The fund data is generally compiled and provided by a vendor either on CD ROM or via an on line service (not shown). The fund data includes a universe of funds and investment parameters for each fund. For example, a current data base available from Morningstar, Inc. provides data for more than 100 investment parameters for each of more than 9,000 funds.

Memory 42 includes any type of state of the art memory, as, for example, RAM, EPROM, magnetic tape or disk storage devices, optical storage devices, and the like and includes memory drives for such devices. In some preferred embodiments, memory data portion 42A includes a CD ROM that contains the data base for the universe of mutual funds. Security search procedure 42B may be resident in memory 42 or be contained on a CD-ROM, a magnetic disk or other portable memory media that can be inserted into a memory drive of memory 42.

Security search procedure 42B enables a user to select a manageable number of funds from the universe on an interactive basis. Security search procedure 42B enables the presentation of fund data via display 47 to the user for interactive selection by operation of computer input devices 48. Computer input devices 48 suitably include a keyboard and/or a point and click mouse or other cursor positioning and selection devices.

Figure 2:
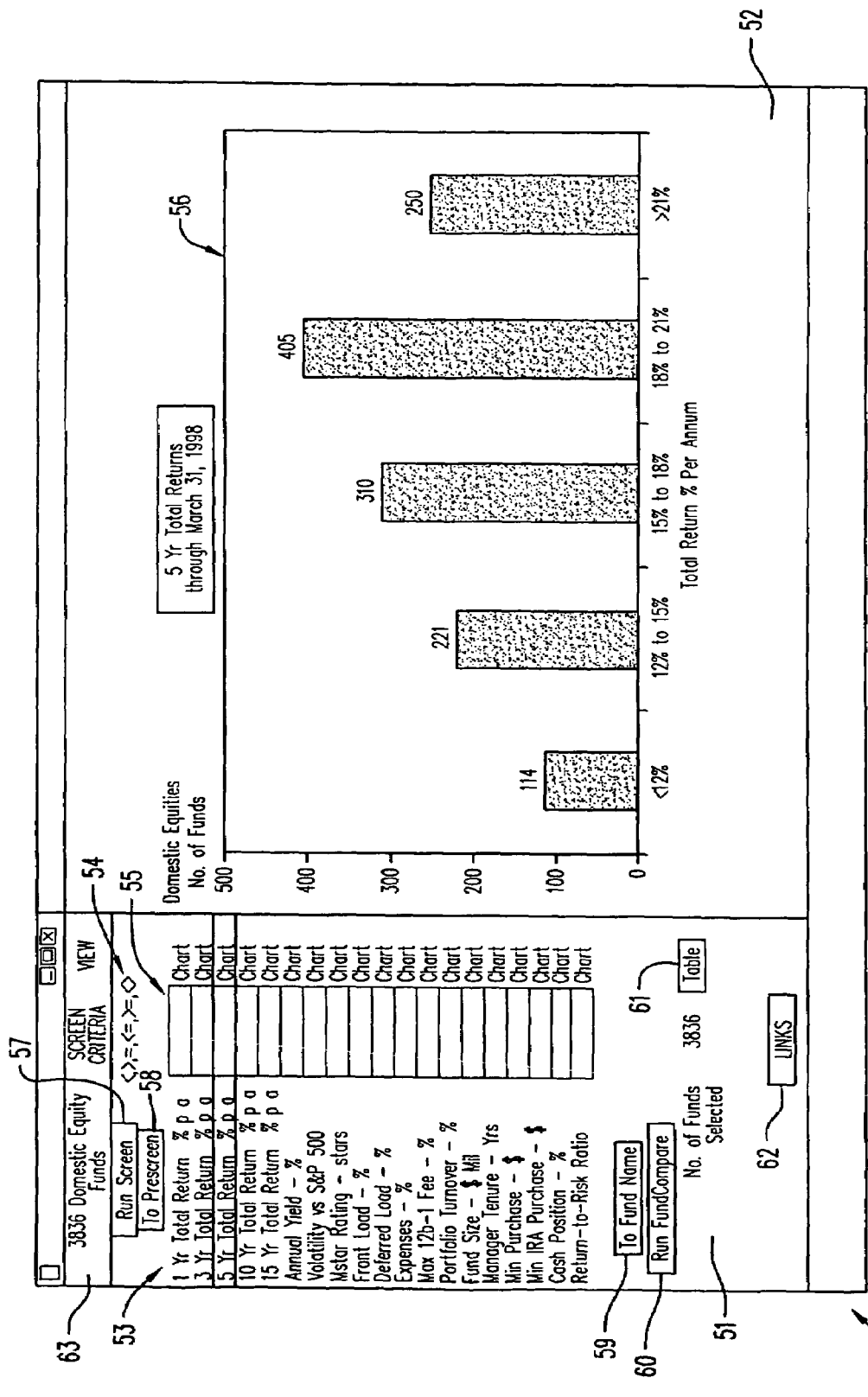
FIG. 2 is a viewing screen layout of a split screen display for a universe of financial instruments prior to filtering.

In accordance with the present invention, the fund data is presented to the user in a format that is easy to view, easy to use and easy to make quick selection of filter conditions for a fund search. This format is shown in FIG. 2 as using a viewing screen 50 of display 47 having first and second display areas 51 and 52 arranged in a split screen. Display area 51 contains control data for user selection in the fund search process. Display area 52 is generally used to display data about the financial instruments in either tabular or chart form. A significant feature of the present invention is to present in display area 52 a population distribution or histogram frequency of occurrence chart based on user selected control data. However, display area 52 may also contain some control data for selection purposes.

The control data in display area 51 include a plurality of filter criteria from which the user may select to form a filter condition. The filter criteria include a plurality of investment parameters 53, a plurality of parameter limiters 54 and criteria boxes 55. Investment parameters 53 are limited to a relatively small number selected from the entire set of investment parameters available from the fund data vendor. In the illustrated embodiment, 19 investment parameters are used and comprise the following:

1 Year (Yr) Total Return—percent per annum (% p. a.)
3 Yr Total Return—% p. a.
5 Yr Total Return—% p. a.
10 Yr Total Return—% p. a.
15 Yr Total Return—% p. a.
Annual Yield—%
Volatility vs. Standard and Poor (S&P) 500
Morningstar (Mstar) Rating—stars
Front Load—%
Deferred Load—%
Expenses—%
Maximum (Max) 12b-1 Fee—%
Portfolio Turnover—%
Fund size—$Mil
Manager Tenure—Yrs
Minimum (Min) Purchase—$
Minimum Investment Retirement Account (Min IRA)—$
Cash Position—%
Return-to-Risk Ratio It is also understood that the number and choice of investment parameters is a matter of design choice and can vary from the number of and the specific parameters listed above. However, the number of parameters is preferably limited to a manageable number for display purposes as well as for ease of use.

Parameter limiters 54 comprise a set of mathematical operators as follows:

| | |
|---|---|
| > | greater than |
| < | less than |
| = | equals |
| <= | equal to or less than |
| >= | equal to or greater than |
| <> | not equal to |

It is understood that the number and choice of parameter limiters is a matter of design choice and can vary from the number of and the specific ones listed above.

Figure 5:
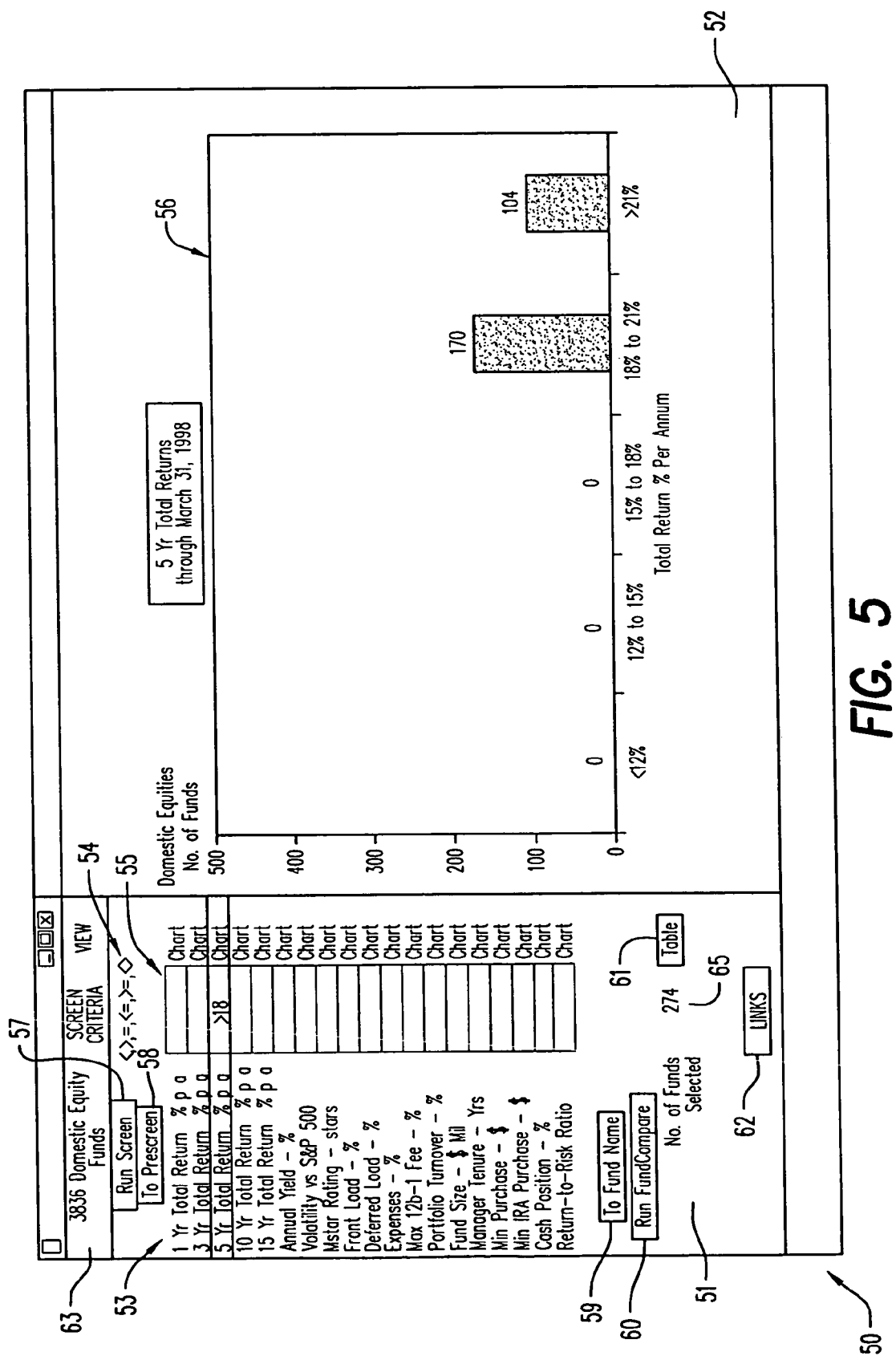
FIG. 5 is a viewing screen layout of a split screen display for user selection of filter parameters for a second filter pass with a histogram for one selected investment parameter.

There is one criteria box 55 for each investment parameter 53. The user can select one or more of investment parameters 53 by operation of computer input devices 48 (FIG. 1). For the illustrated example, the mouse is used to position the cursor over the 5 Yr Total Return investment parameter and clicked. This will highlight the 5 Yr Total Return investment parameter. To select a parameter limiter for the 5 Yr Total Return investment parameter, the cursor is positioned over the criteria box 55 for this parameter and clicked. This will highlight criteria box 55 associated with the 5 Yr Total Return investment parameter. A selected one of the parameter limiters and a desired number can then be entered in the selected box 55, for example, ">18" as shown in FIG. 5.

According to the present invention, a histogram chart 56 showing population or frequency of occurrence distribution for a selected or highlighted investment parameter is displayed in second area 52 of the viewing screen. Histogram 56 has the number of funds along its ordinate and a plurality of frequency of occurrence categories along its abscissa. There are five illustrated categories, but there could be more or less. These categories are a matter of choice and design. For the illustrated embodiment, these categories are: <12%, 12% to 15%, 15% to 18%, 18% to 21%, and >21%.

Thus, a user can view a histogram 56 for each parameter that is selected. This is a powerful aid to the user in the selection of investment parameters 53 and criteria 54 to establish filter conditions. Thus, by selecting only those funds with a greater than 18% total return for a five year period, the number of funds can be limited to 625 (the sum of the two right hand bars). This is quickly done by operating the input devices to insert ">18%" in the criteria box 55 adjacent the 5 Yr Total Return investment parameter.

First display area 51 also includes some control buttons or switches shown as a Run Screen button 57, PreScreen button 58, FundName button 59, a Run FundCompare button 60, a Table button 61 and a LINKS button 62. These buttons are user operable for controlling operation of security search procedure 42B as described hereinafter.

A fund search typically comprises a sequence of n filter passes through the fund universe to provide n progressively smaller numbers or sets of funds until a manageable number of funds is presented to the user for analysis, investment or other purpose.

Each filter pass has a filter condition that is selected from the plurality of parameter limiters 54 and the plurality of investment parameters 53.

The method of searching a universe of funds according to the present invention is as follows:

(a) Configuring the processor 43, the memory 42, the memory access device 44, the viewing screen 50 and the computer input devices 48 to conduct the search.

(b) Presenting on viewing screen 50 of display 47 the investment parameters 53 and the parameter limiters 54. This allows the user to view all of the filter criteria at a glance so as to enable quick selection for forming a filter condition.

(c) Presenting on viewing screen 50 a histogram showing the population of the funds in different frequency of occurrence categories for a proposed filter condition of the $i^{th}$ one of the filter passes. The proposed filter condition includes all filter conditions for previously performed filter passes as well as proposed new criteria for the $i^{th}$ pass. This gives the user a powerful aid for filter condition selection as it can be seen at a glance what the fund distribution is across the frequency of occurrence categories. In preferred embodiments, the plurality of investment parameters and parameter limiters and histogram are presented simultaneously on the viewing screen in display areas 52 and 52.

(d) Executing the proposed or $i^{th}$ filter pass in response to a run command generated by user operation of the input device. The run command is generated by the security search procedure 42B in response to user operation of the Run Screen button 57 in FIG. 2.

(e) Repeating steps (a), (b) and (c) until the $n^{th}$ filter pass has been performed.

(f) Optionally the n filter passes can be combined with the PreScreen investment category filter that is described below.

The invention will be best understood by considering a typical fund search that will be described with reference to FIGS. 2 through 20 for a sequence of n=5 filter passes.

For the illustrated viewing screens, there are 3,836 funds in the fund universe as shown at 63 in display area 51. With computer input devices 48, the user selects the To PreScreen button 58. This causes the To Prescreen button 58 to be backlighted or other wise highlighted on viewing screen 50. This also causes security search procedure 42B to display in display area 52 a plurality of fund categories as shown at 64 in FIG. 3. This allows filtering by fund category. The user operates computer input devices 48 to select the Aggressive Growth and Growth fund categories. This will yield 1,387 funds as shown at 65 in display area 52. The user can further limit the filter pass by selecting a fund family as shown at 68. A select button 69 would then be used to register the selected fund family. For this example a fund family is not selected. The user also has the option of aborting a PreScreen filter operation by using computer input devices 48 to operate a deactivate button 66. The user then initiates execution of the first filter pass by operating computer input devices 48 to select Run Screen button 57 or an activate button 67.

Figure 4:
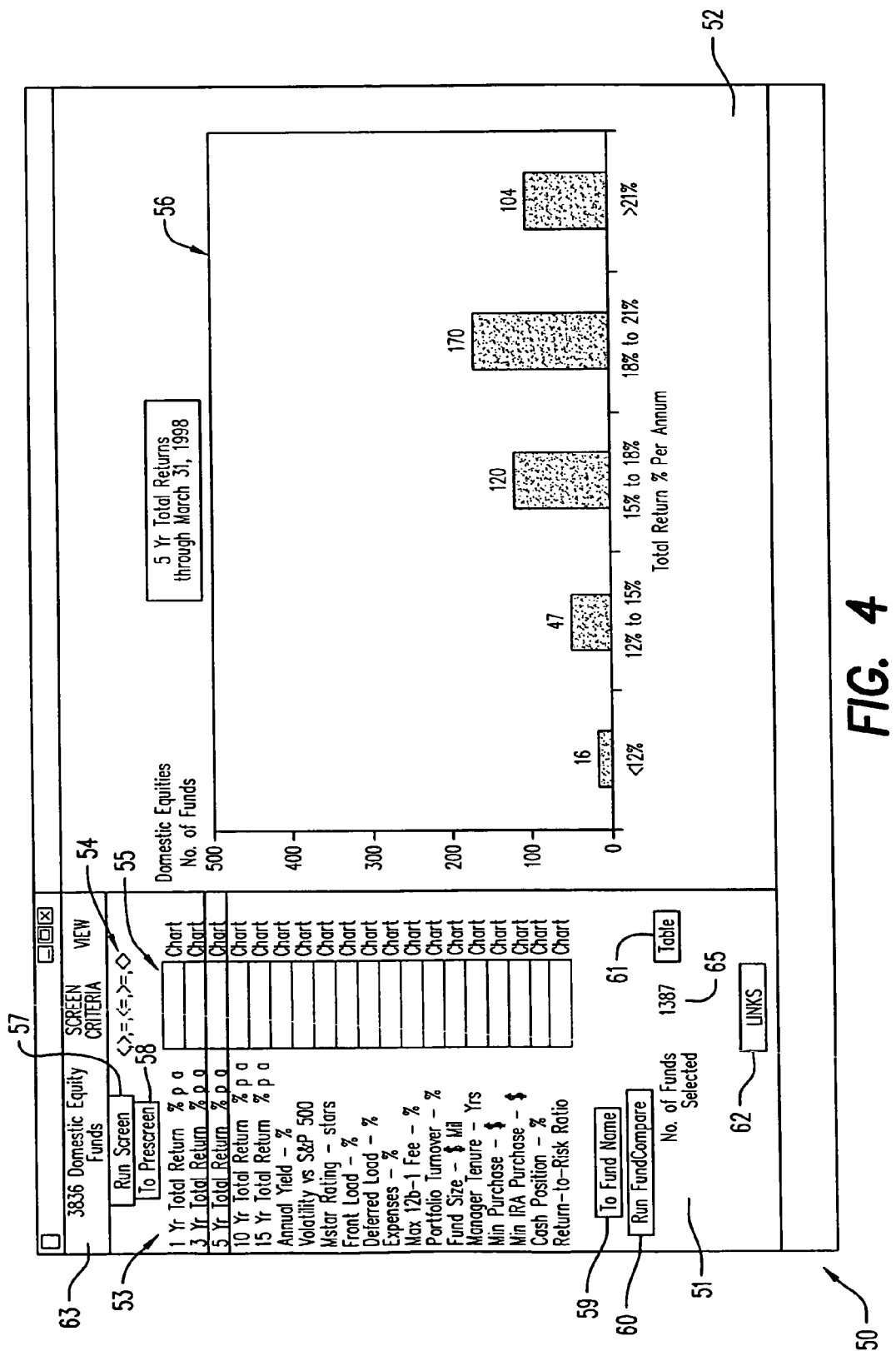
FIG. 4 is a histogram for one investment parameter after the first filter pass.

Security search procedure 42B then causes processor 43, memory 42, memory access device 44, computer input devices 48 and viewing screen 50 configured as a filter to execute the first filter pass. This will revise each of the histograms based on the set of funds remaining after the first filter pass. To select the conditions for the second filter pass, the user by operation of computer input devices 48 can select one or more investment parameters 53 to view a new histogram for that parameter. FIG. 4 shows the histogram for 5 Yr Total Return in display area 52. This histogram enables the user to see at a glance the population categories in which the Aggressive Growth and Growth funds are distributed so as to quickly make a choice of parameter limiters for the next filter pass.

The user, seeking high growth, selects those funds returning greater than 18% total return for five years. This is illustrated in FIG. 5 where the parameter limiter ">18%" is inserted into the box adjacent the 5 Yr Total Return investment parameter. This will yield a set of 274 funds after the second filter pass. The user then initiates execution of the second filter pass by operating computer input devices 48 to select Run Screen button 57.

Figure 6:
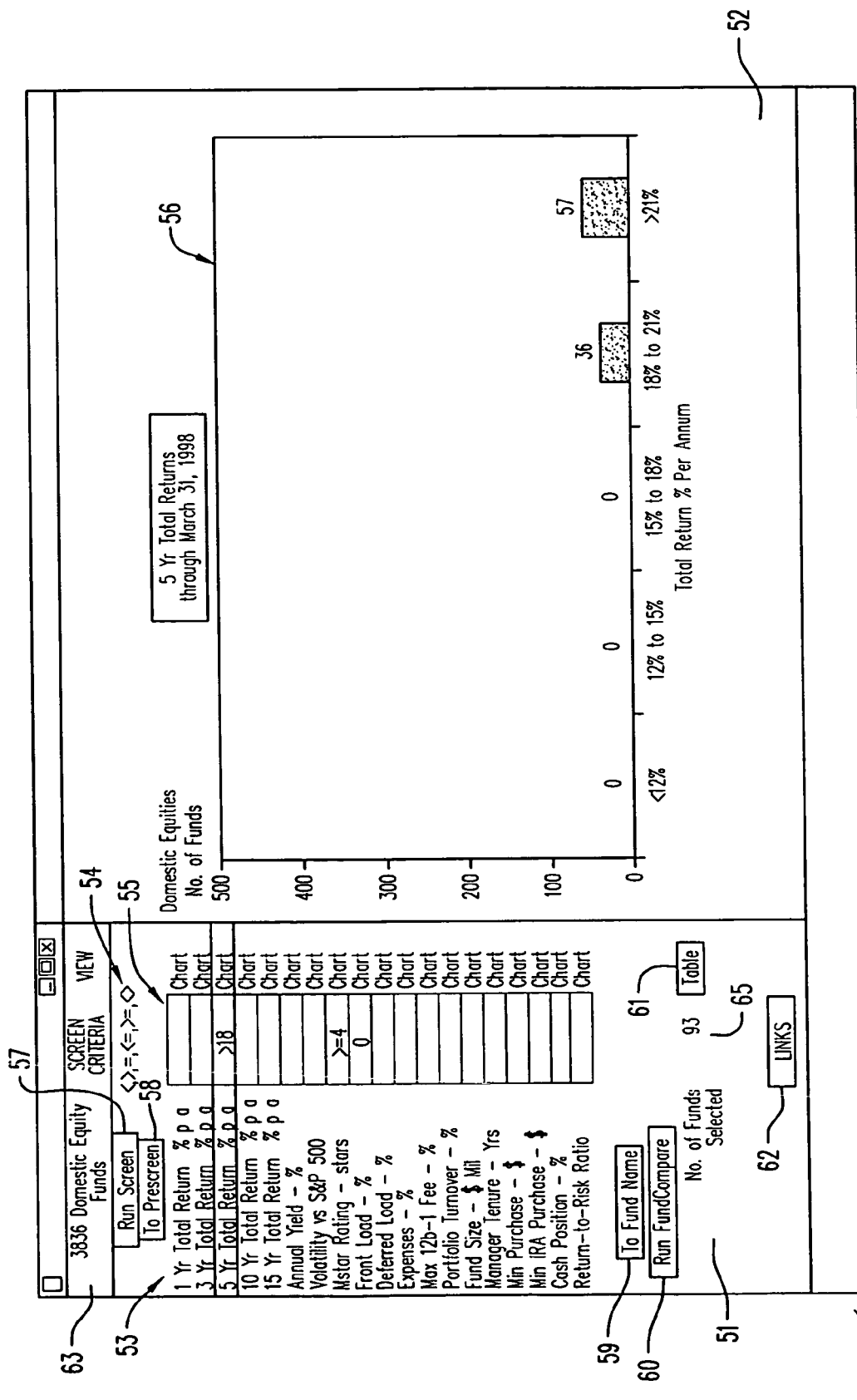
FIG. 6 is a viewing screen layout of a split screen display for user selection of filter parameters for a third filter pass with a histogram for one selected investment parameter.
Figure 7:
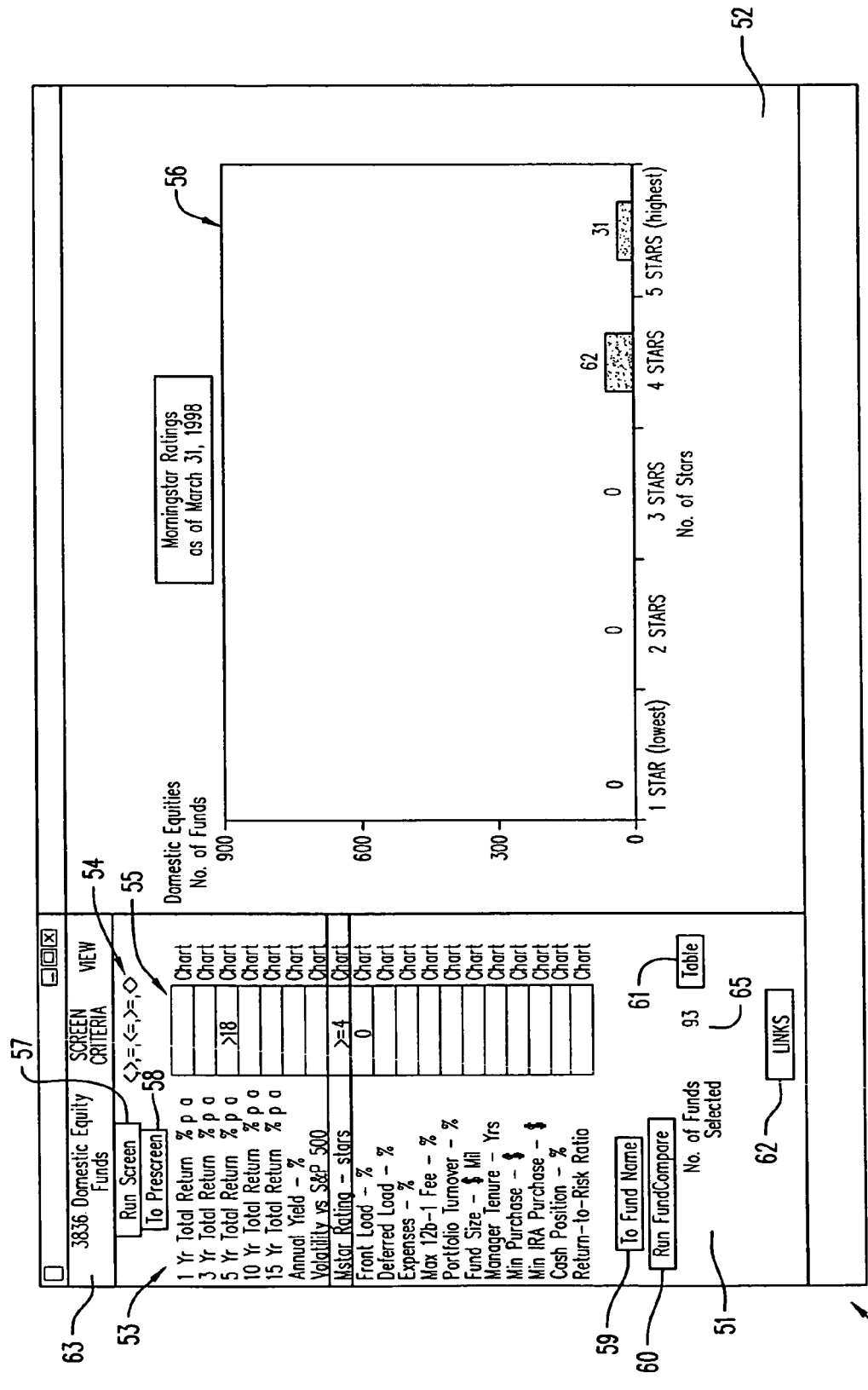
FIGS. 7 and 8 are histograms for other investment parameters selected for a third filter pass.
Figure 8:
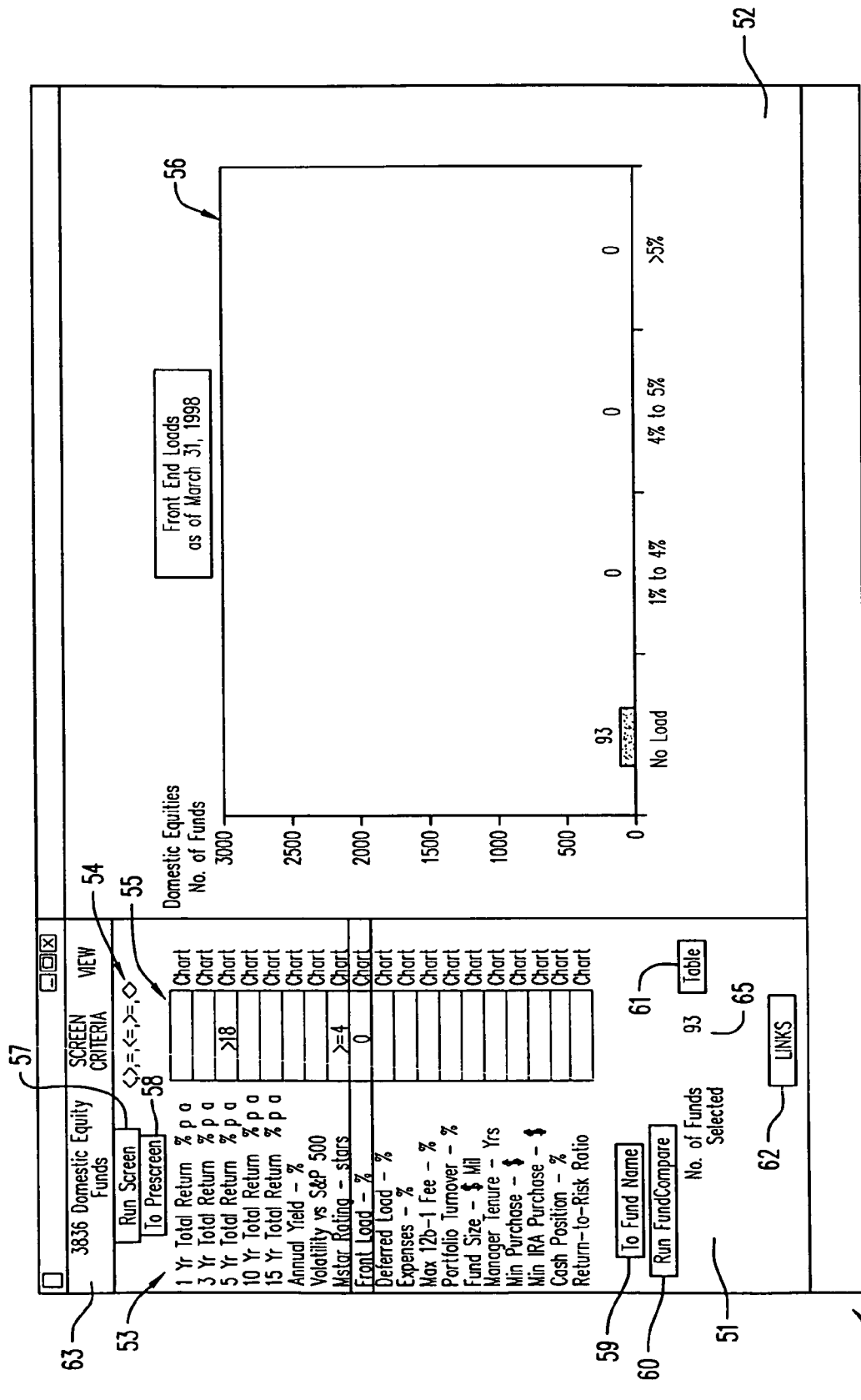

Security search procedure 42B then causes processor 43, memory 42, memory access device 44, computer input devices 48 and viewing screen 50 to be configured as a filter to execute the second filter pass. This will revise each of the histograms based on the set of funds remaining after the second filter pass. To select the conditions for the third filter pass, the user by operation of computer input devices 48 can select one or more investment parameters 53 to view a new histogram for that parameter. FIG. 6 shows the histograms for 5 Yr Total Return in display area 52. FIGS. 7 and 8 show histograms for the Morningstar ratings and Front Load percentages.

The user, deciding to limit risk and cost somewhat, selects a Morningstar rating of 4 or more and a Front Load cost of zero. These criteria selections are entered in the criteria boxes 55 by user operation of computer input devices 48 as shown in display area 51 of FIG. 6. These filter conditions will yield a set of 93 funds after filtering. The user then initiates execution of the third filter pass by operating computer input devices 48 to select Run Screen button 57.

Figure 9:
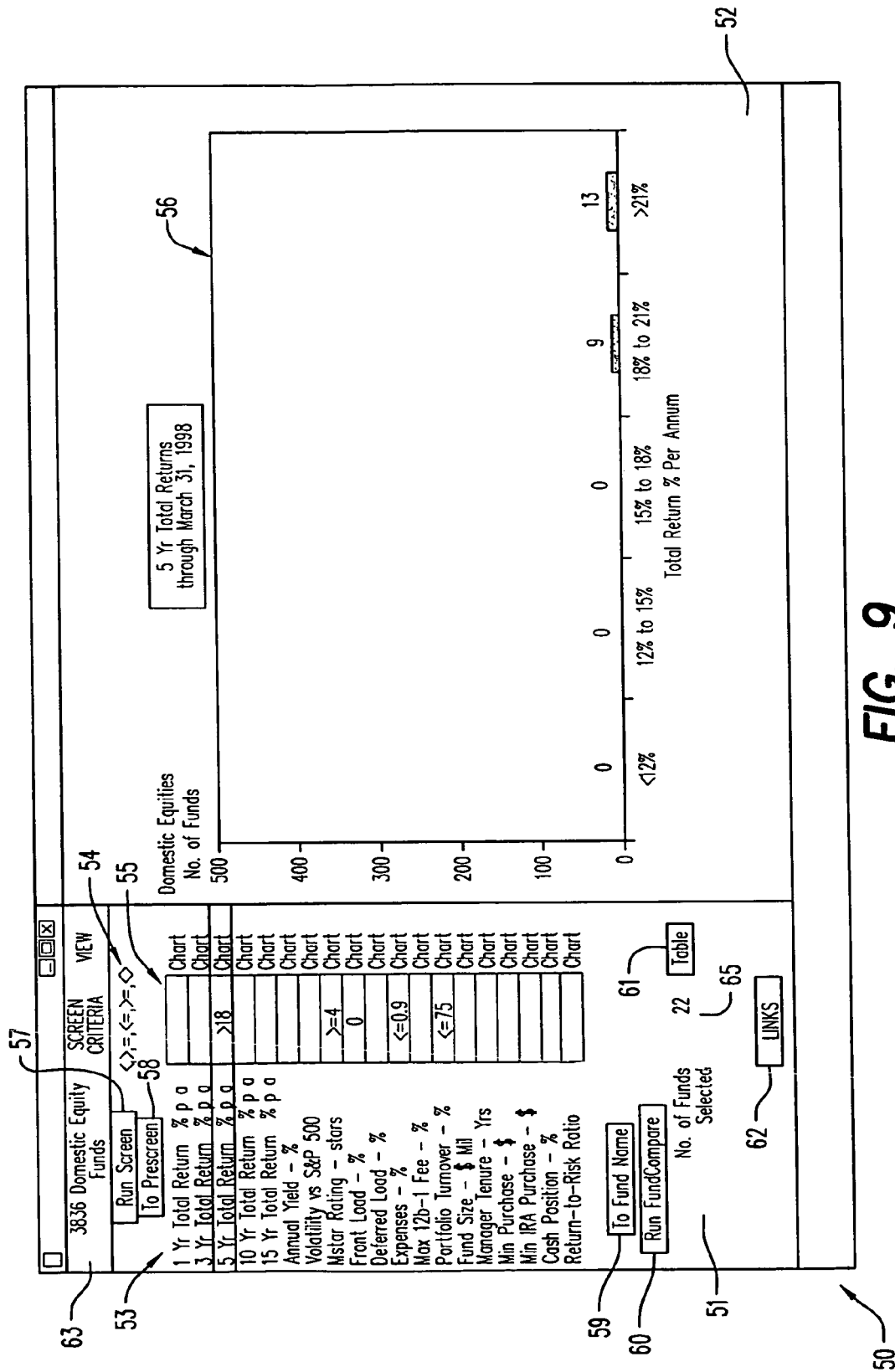
FIG. 9 is a viewing screen layout of a split screen display for user selection of filter parameters for a fourth filter pass with a histogram for one selected investment parameter.
Figure 10:
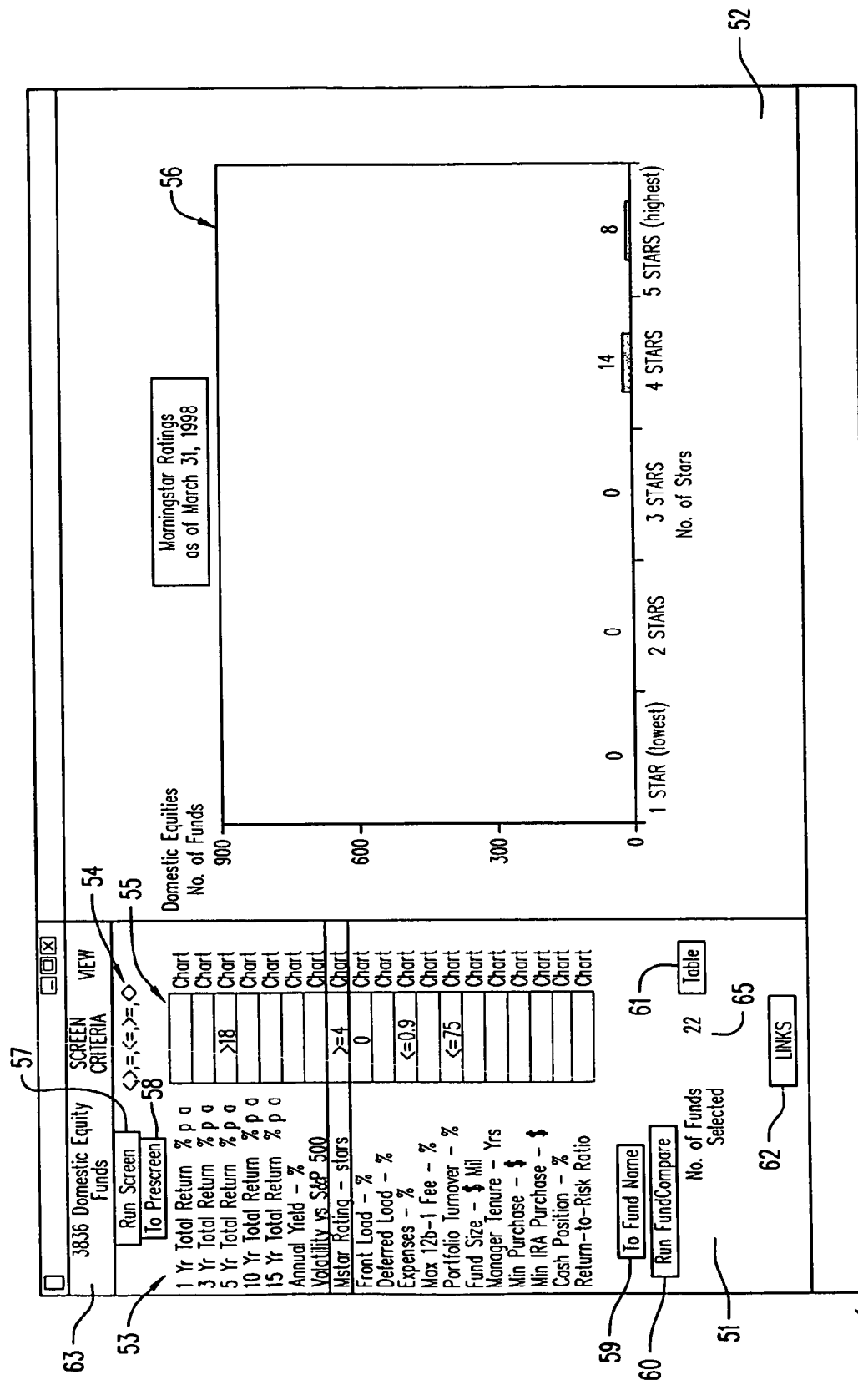
FIGS. 10 through 13 are histograms for other investment parameters selected for the fourth filter pass.
Figure 11:
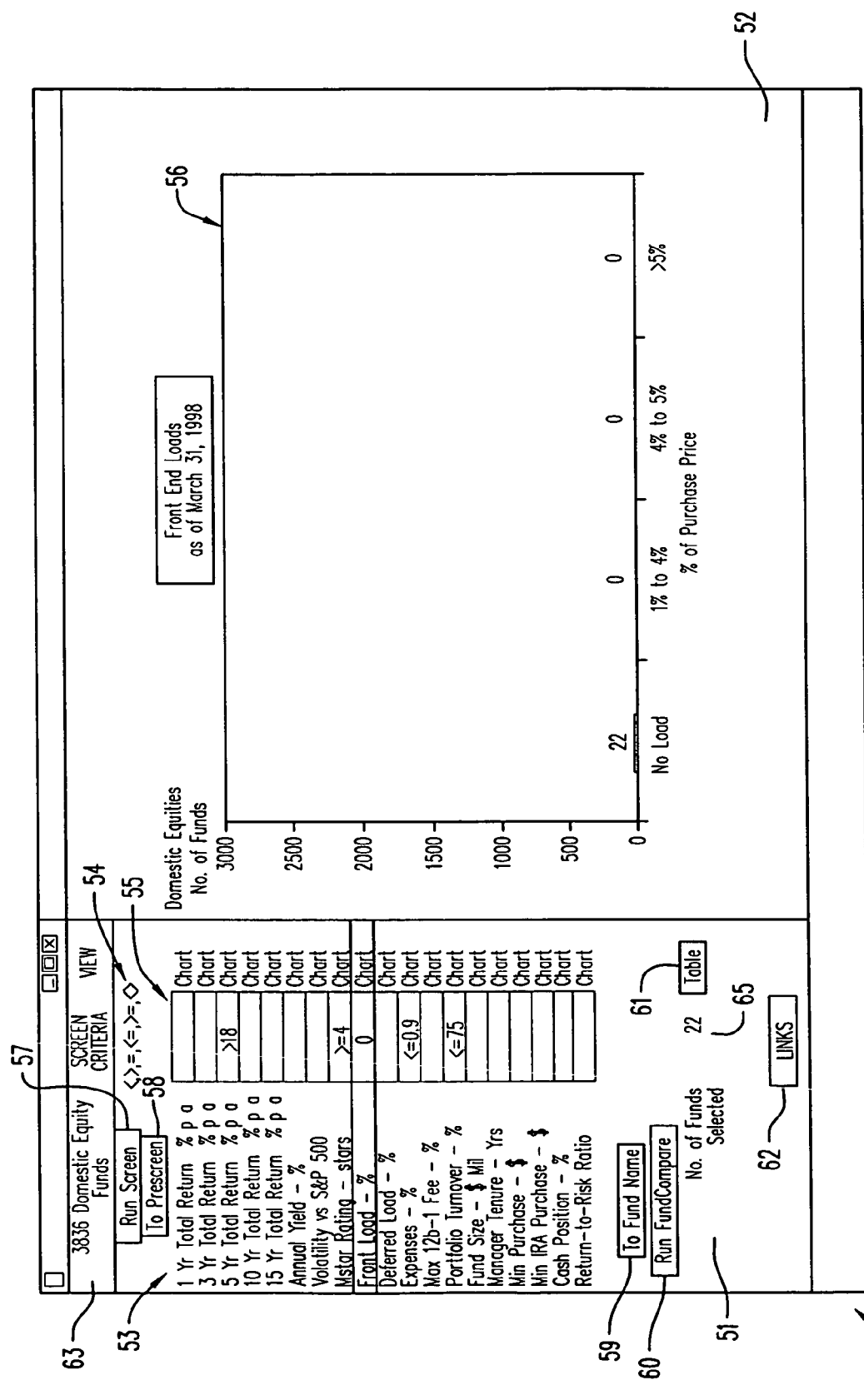
Figure 12:
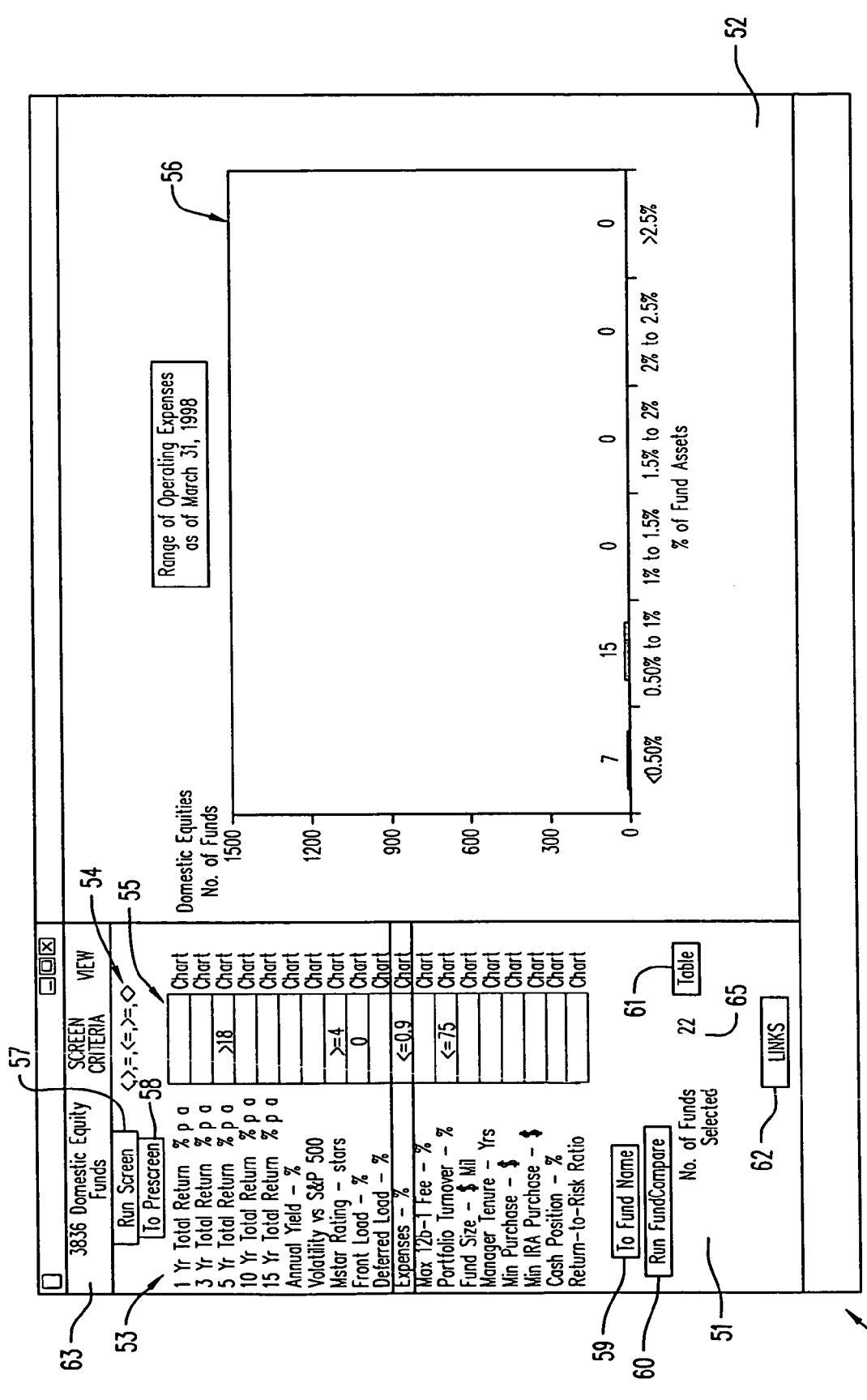
Figure 13:
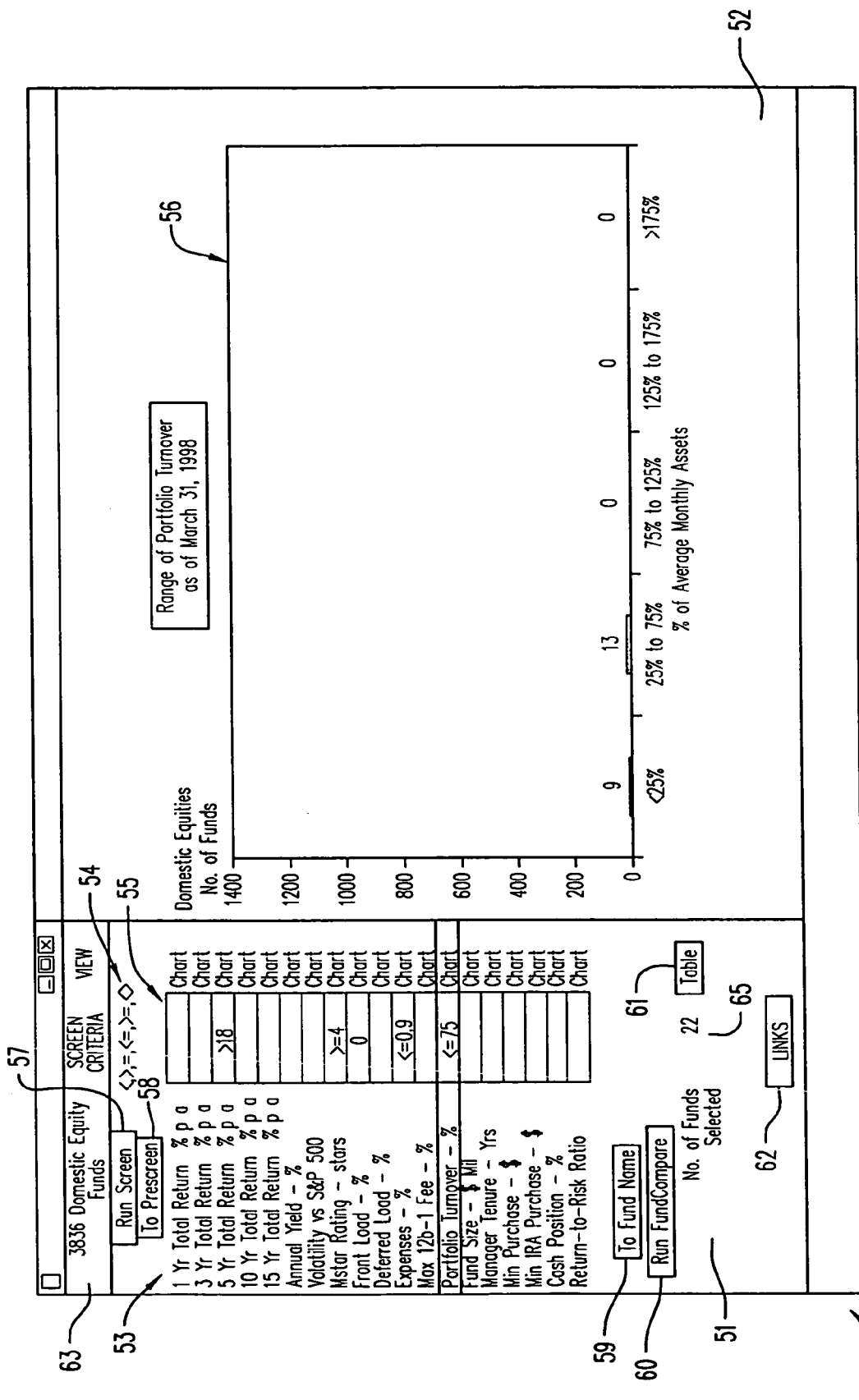

Security search procedure 42B then causes processor 43, memory 42, memory access device 44, computer input devices 48 and viewing screen 50 to be configured as a filter to execute the third filter pass. This will revise each of the histograms based on the set of funds remaining after the third filter pass. To select the conditions for the fourth filter pass, the user by operation of computer input devices 48 can select one or more investment parameters 53 to view a new histogram for that parameter. FIG. 9 shows the histograms for the 5 Yr Total Return investment parameter in display area 52. FIGS. 10 through 13 show histograms for the Morningstar ratings, Front Load percentages, Range of Operating Expense and Range of Portfolio Turnover investment parameters.

The user, deciding to limit cost further and to limit taxes, selects a fund operating expense equal to or less than 0.9% and a Portfolio turnover equal to or less than 75%. These criteria selections are entered in the criteria boxes 55 by user operation of computer input devices 48 as shown in display area 51 of FIG. 9. These filter conditions will yield a set of 22 funds after filtering. The user then initiates execution of the fourth filter pass by operating computer input devices 48 to select Run Screen button 57.

Figure 14:
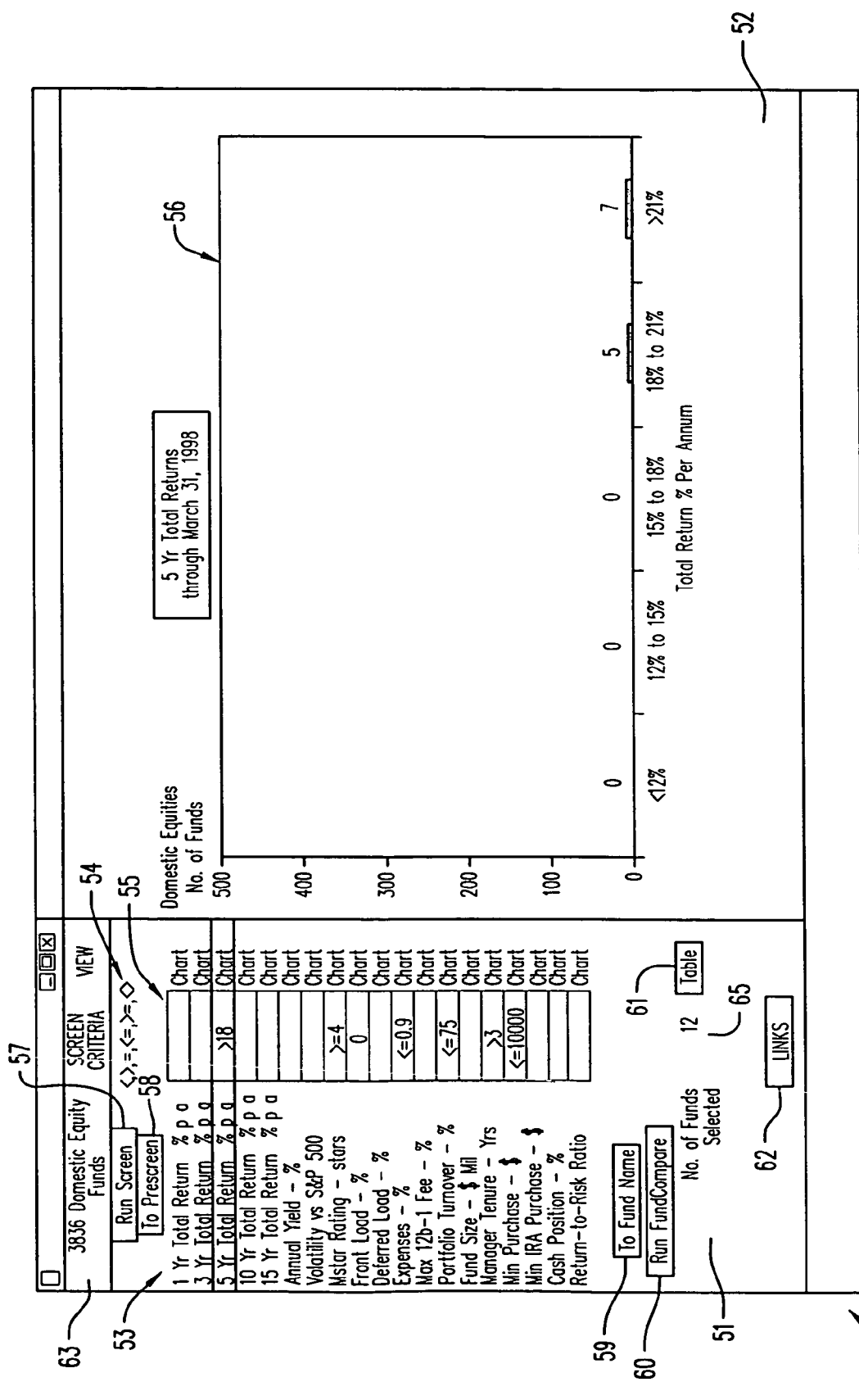
FIG. 14 is a viewing screen layout of a split screen display for user selection of filter parameters for a fifth filter pass with a histogram for one selected investment parameter.
Figure 15:
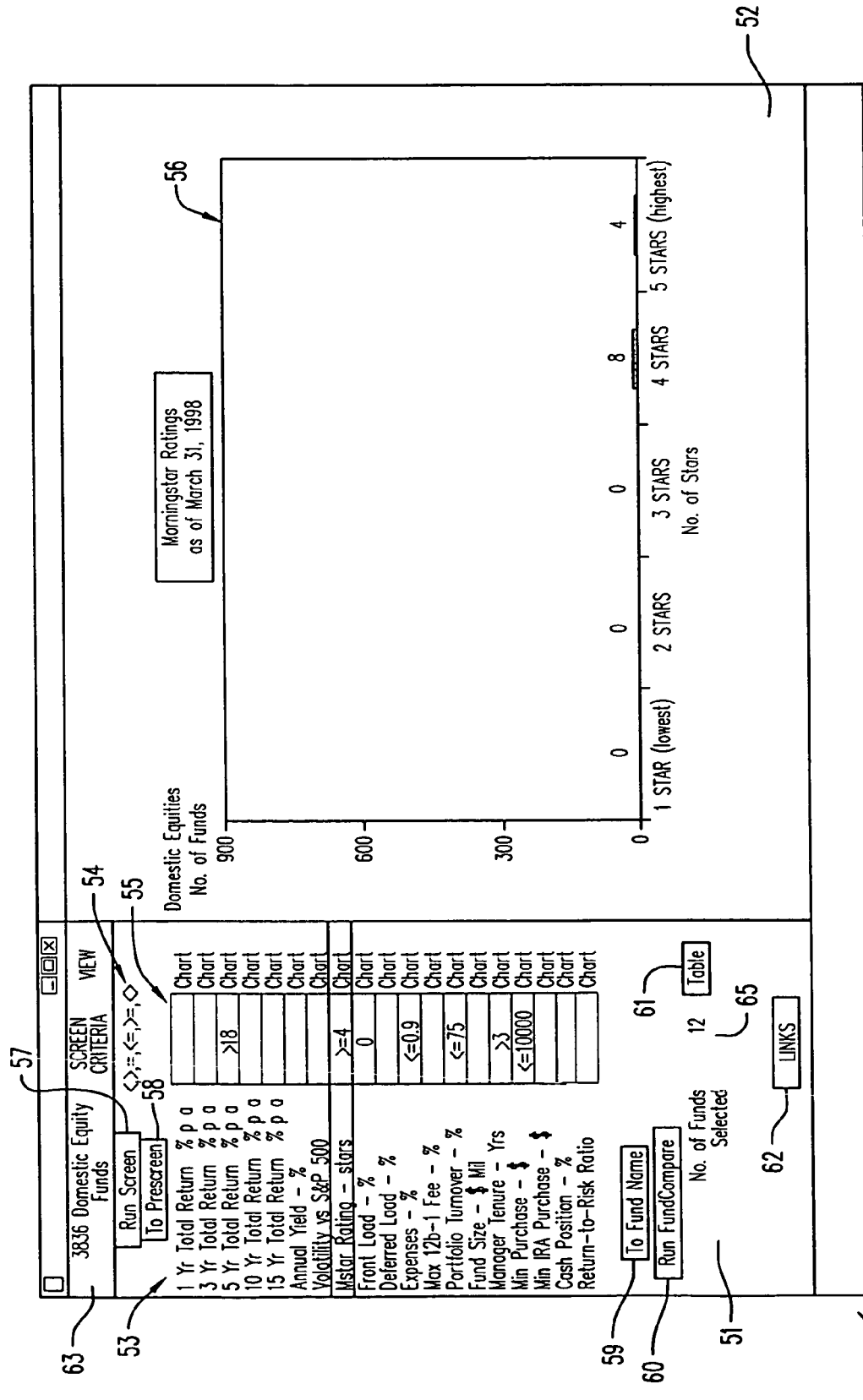
FIGS. 15 through 20 are histograms of other investment parameters selected for the fifth filter pass.
Figure 16:
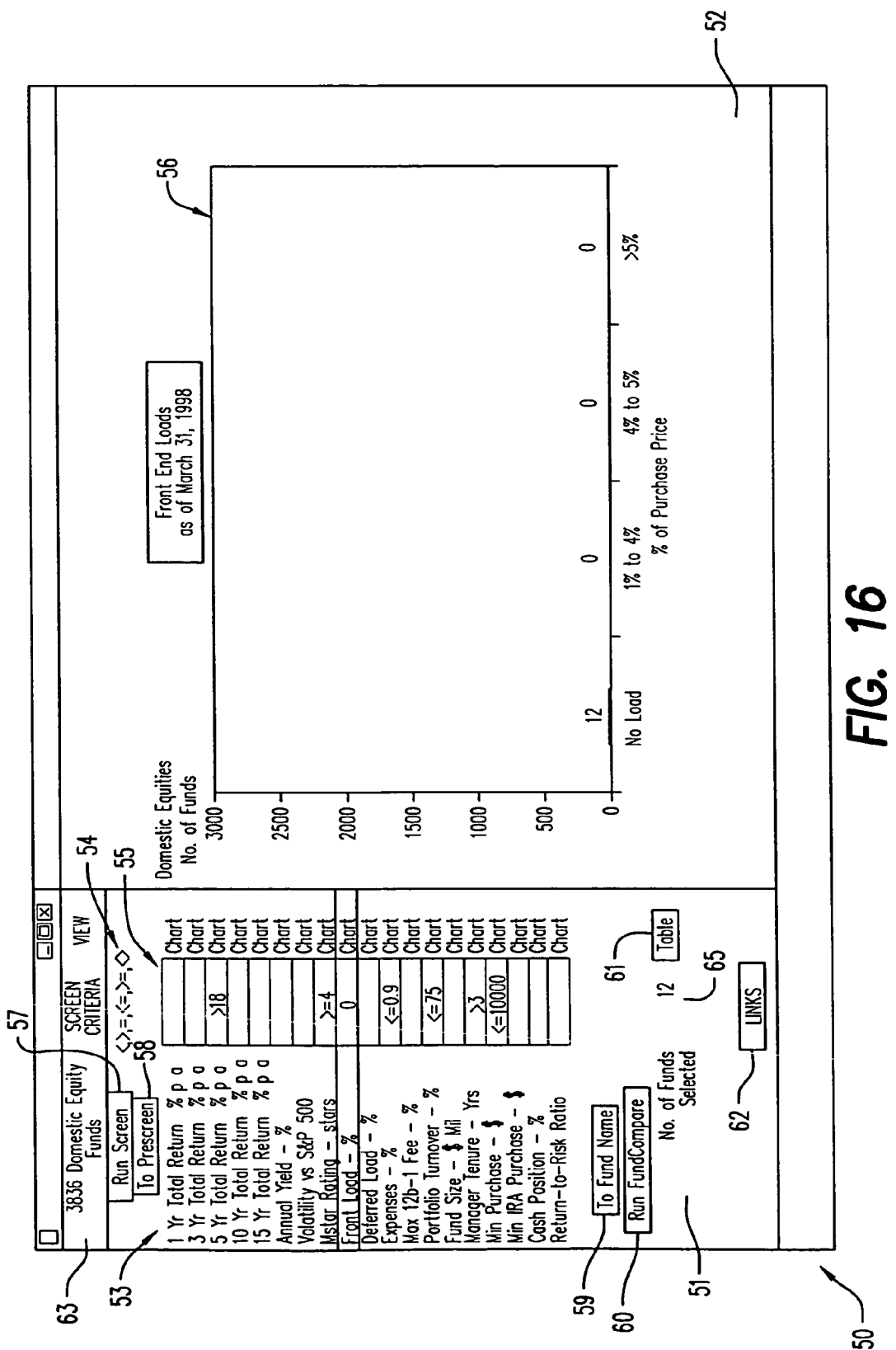
Figure 17:
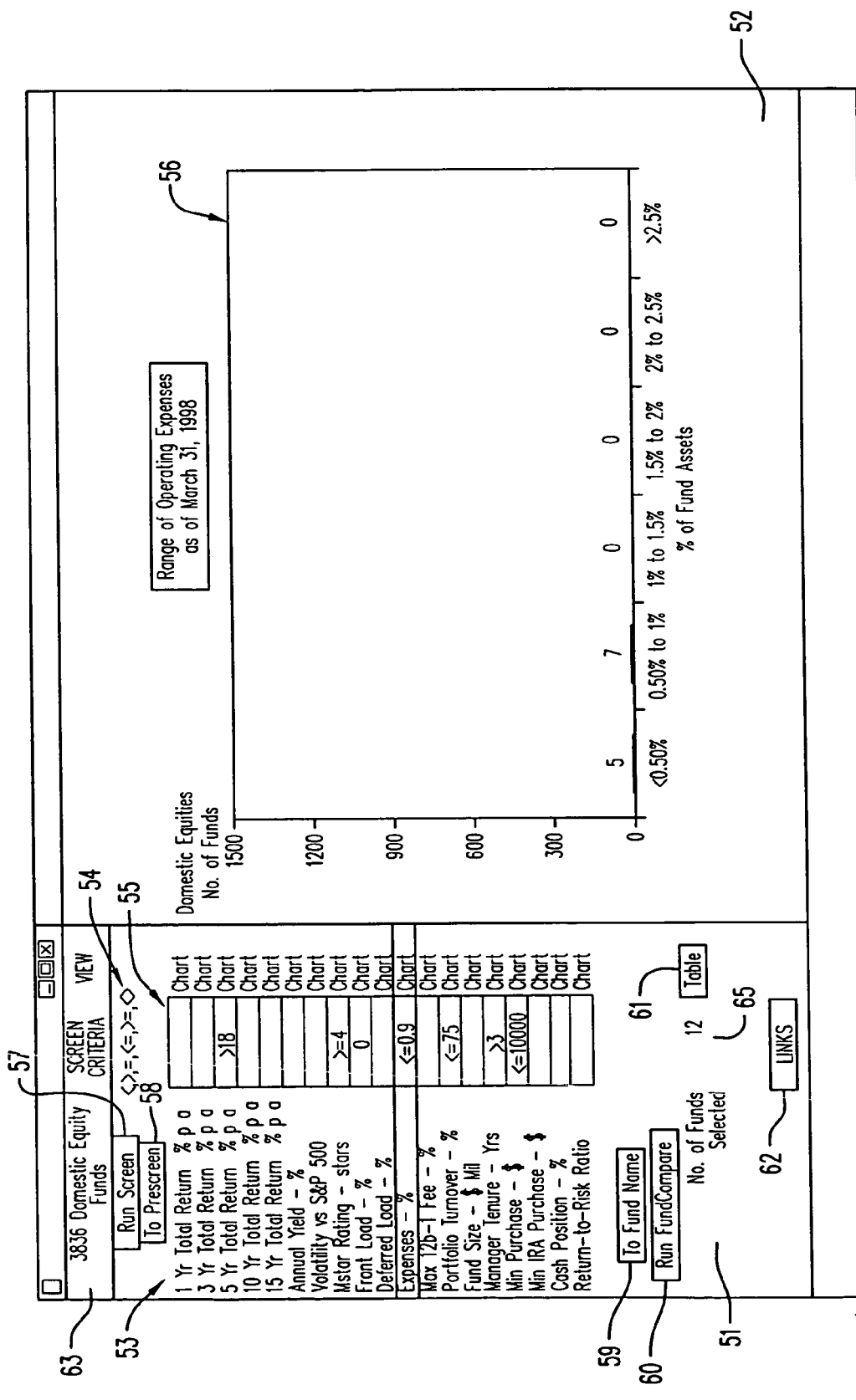
Figure 18:
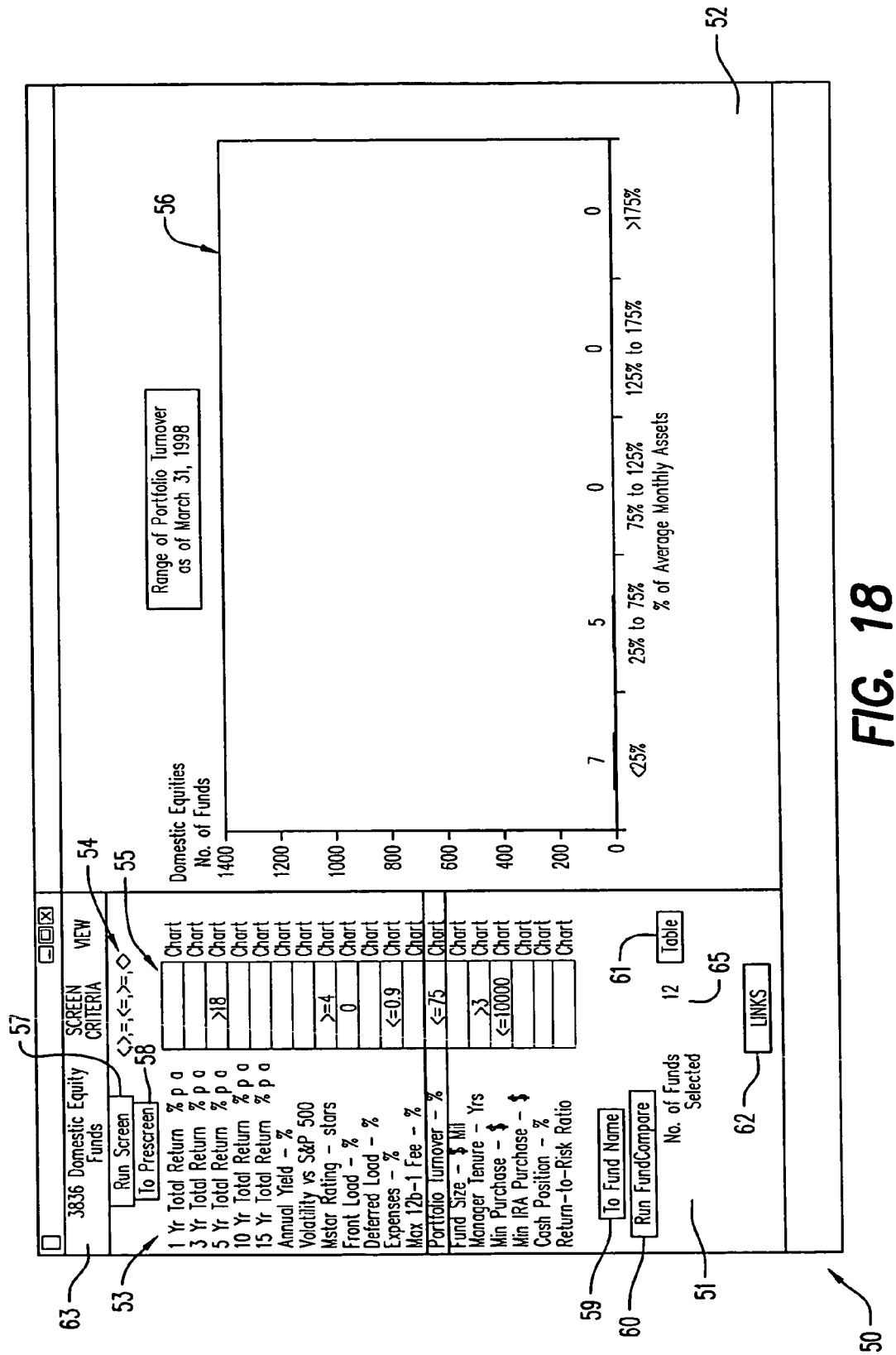
Figure 19:
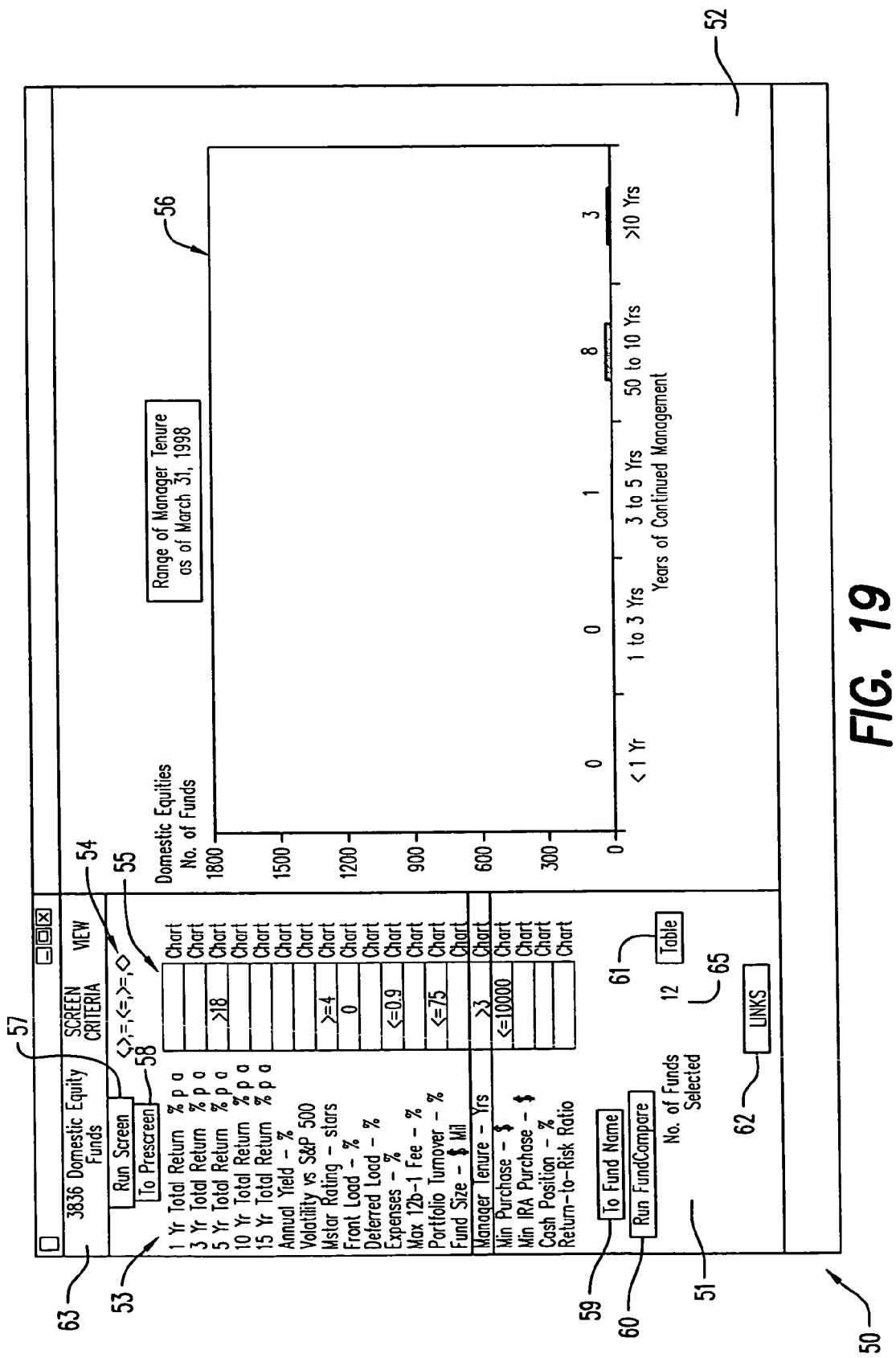
Figure 20:
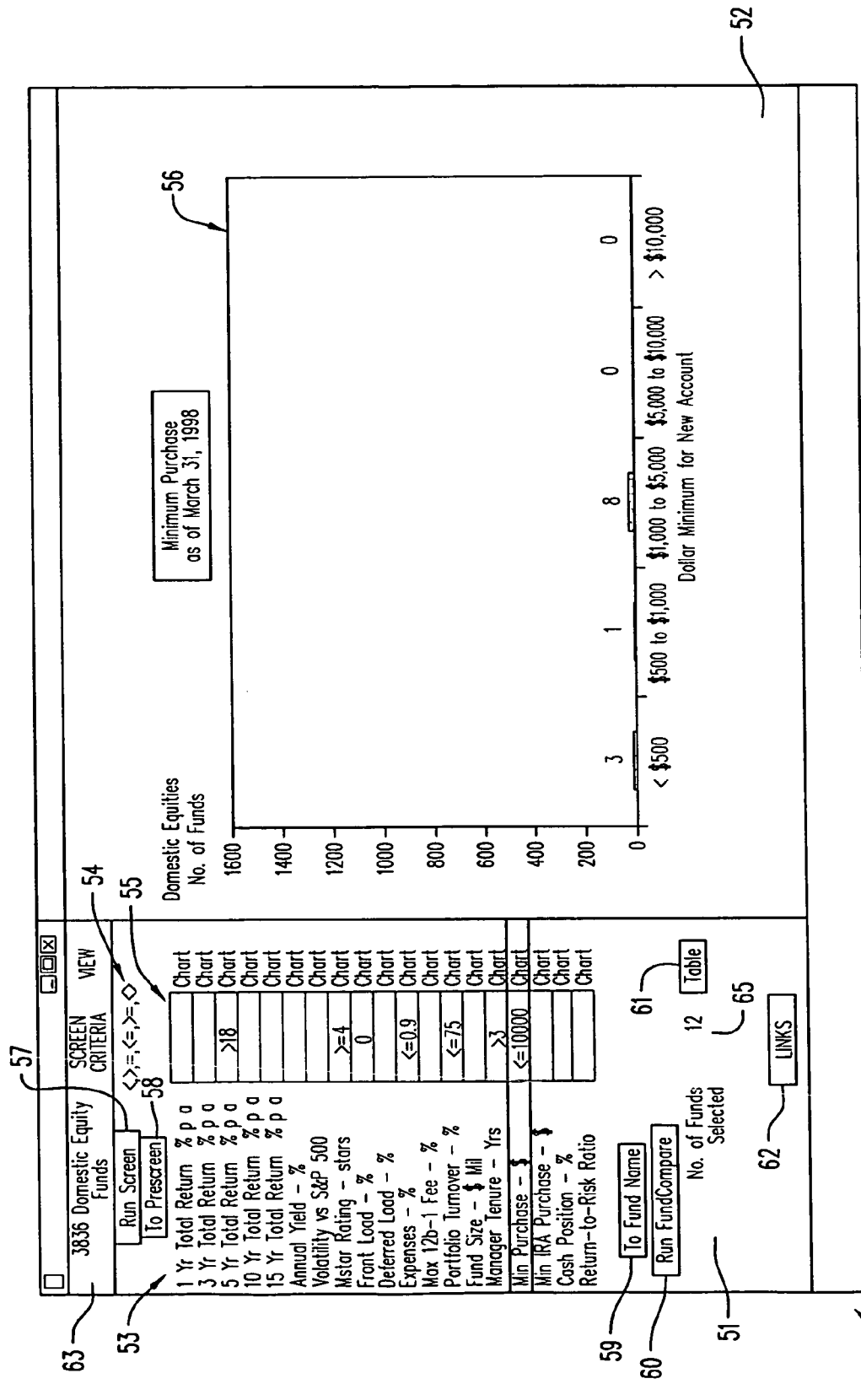

Security search procedure 42B then causes processor 43, memory 42, memory access device 44, computer input devices 48 and viewing screen 50 configured as a filter to execute the fourth filter pass. This will revise each of the histograms based on the set of funds remaining after the fourth filter pass. To select the conditions for the fifth filter pass, the user by operation of computer input devices 48 can select one or more investment parameters 53 to view a new histogram for that parameter. FIG. 14 shows the histograms for the 5 Yr Total Return investment parameter in display area 52. FIGS. 15 through 20 show histograms for the Morningstar ratings, Front Load percentages, Range of Operating Expense, Range of Portfolio Turnover, Range of Manager Turnover and Minimum Purchase investment parameters.

The user, deciding in favor of fund management experience and moderate minimum purchases, selects fund manager tenure of greater than 3 years and a minimum purchase equal to or less than $10,000. These criteria selections are entered in the criteria boxes 55 by user operation of computer input devices 48 as shown in display area 51 of FIG. 20. These filter conditions will yield a set of 12 funds after filtering. The user then initiates execution of the fifth filter pass by operating computer input devices 48 to select Run Screen button 57.

The user by operating the computer input devices 48 can now select the Table button 61 (FIG. 2) to display the investment parameter data for each of the 12 funds. If desired, the user can have the tabular data printed via printer 49 of FIG. 1.

The foregoing fund search leaves the user with a manageable number of 12 funds. With practice, the user will learn to combine filter passes so as to use multiple investment parameters and criteria to limit early round filter passes.

The security search procedure 42B can be designed to run in any suitable application platform such as a spread sheet, data base and the like. In a preferred embodiment, security search procedure 42B is designed to run in the EXCEL spread sheet application, available from Microsoft Corporation of Redmond, Wash.

In the user interactive apparatus described so far, to assign a parameter limiter to a selected one of investment parameters 53, the user must select one of the parameter limiters 54, optionally select an associated number and insert these selections into the criteria box 55 associated with the selected investment parameter. For example, FIG. 5 shows the user has selected ">15" as a parameter limiter and inserted it into the box 55 for the 5 YR Total Return investment parameter.

Figure 24:
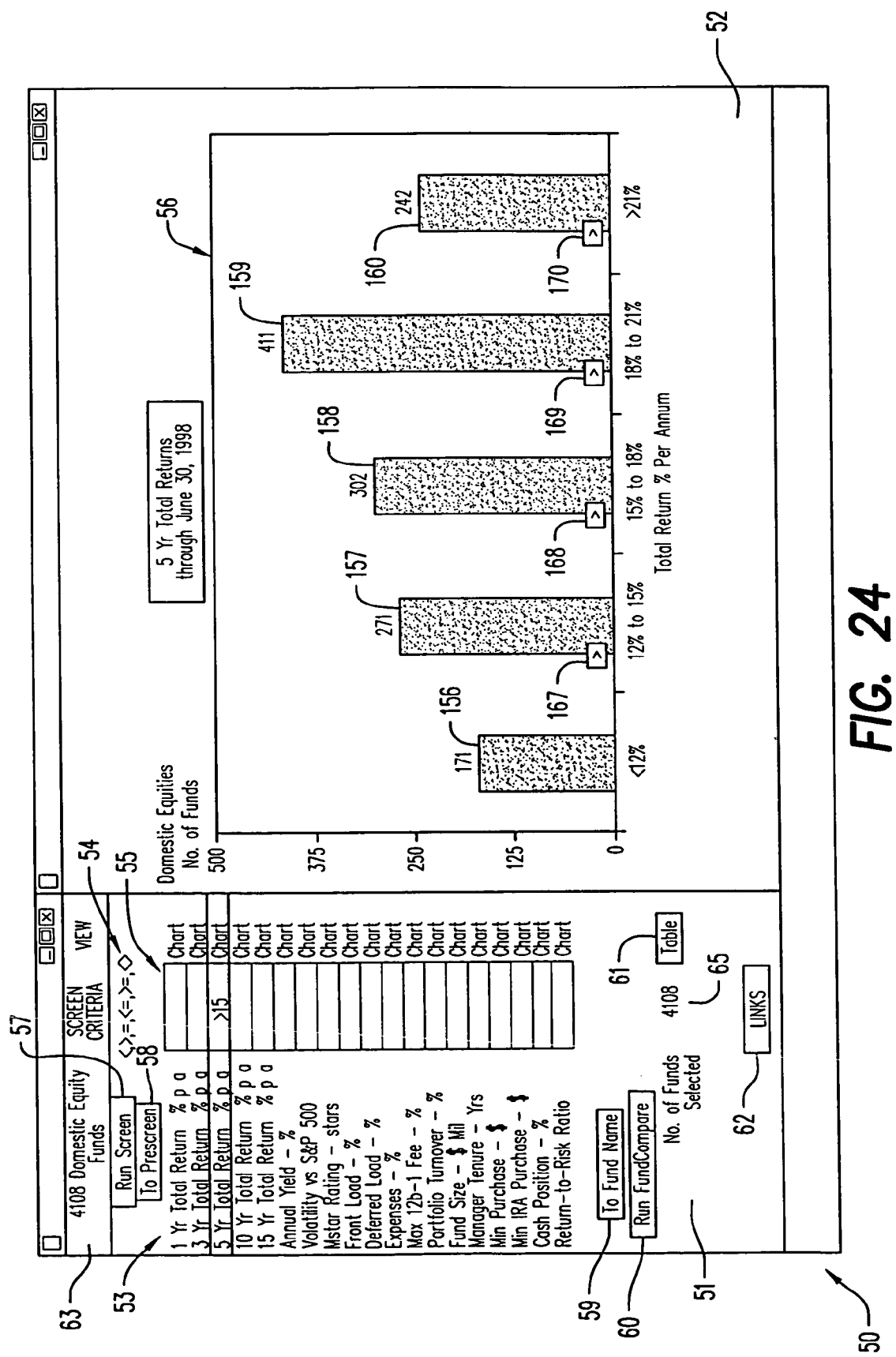
FIG. 24 is a viewing screen layout of a split screen display for an alternative embodiment for user selection of a parameter limiter for a selected investment parameter.
Figure 25:
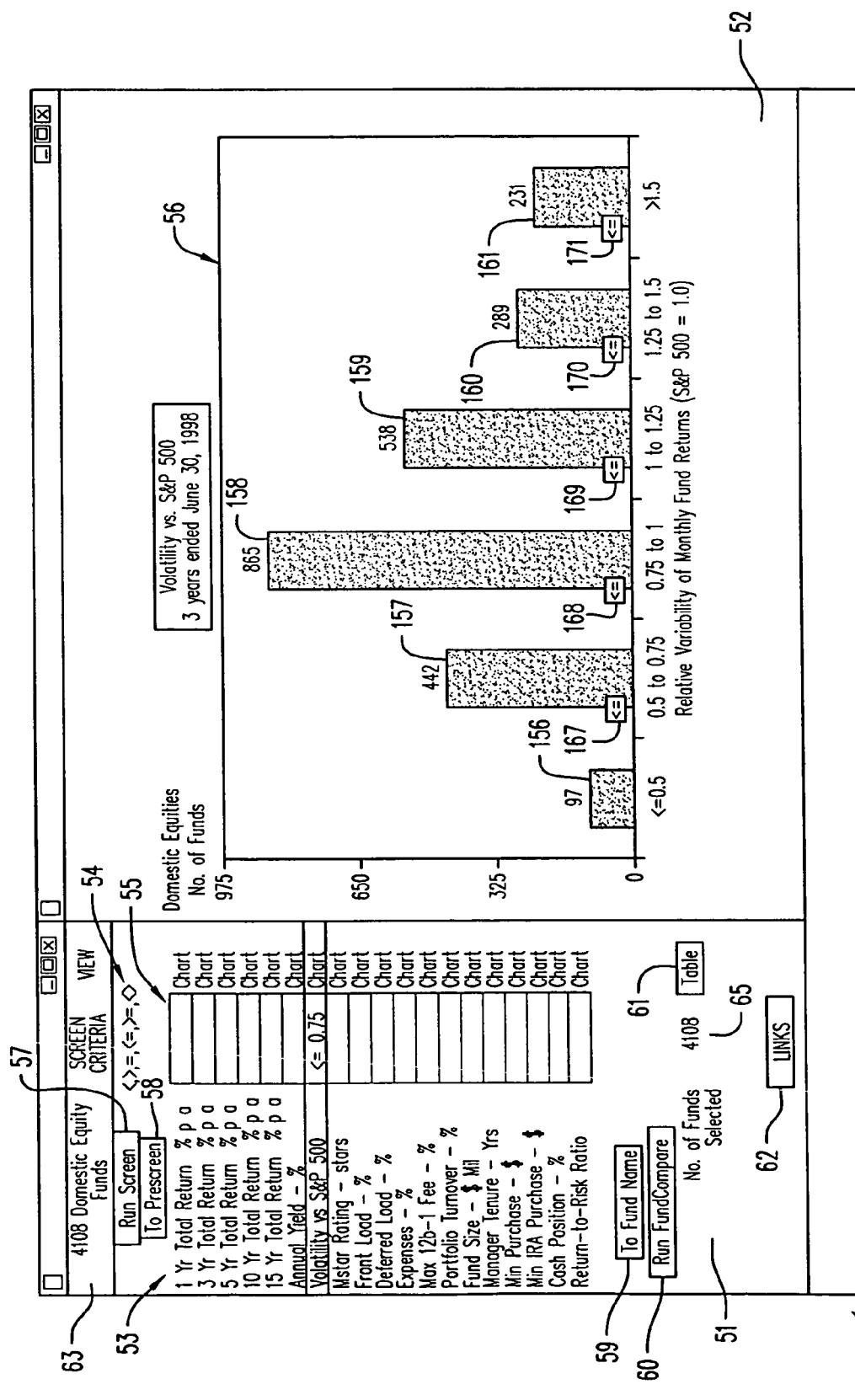
FIG. 25 is a viewing screen layout of a split screen display for an alternative embodiment for user selection of a parameter limiter for another selected investment parameter.
Figure 26:
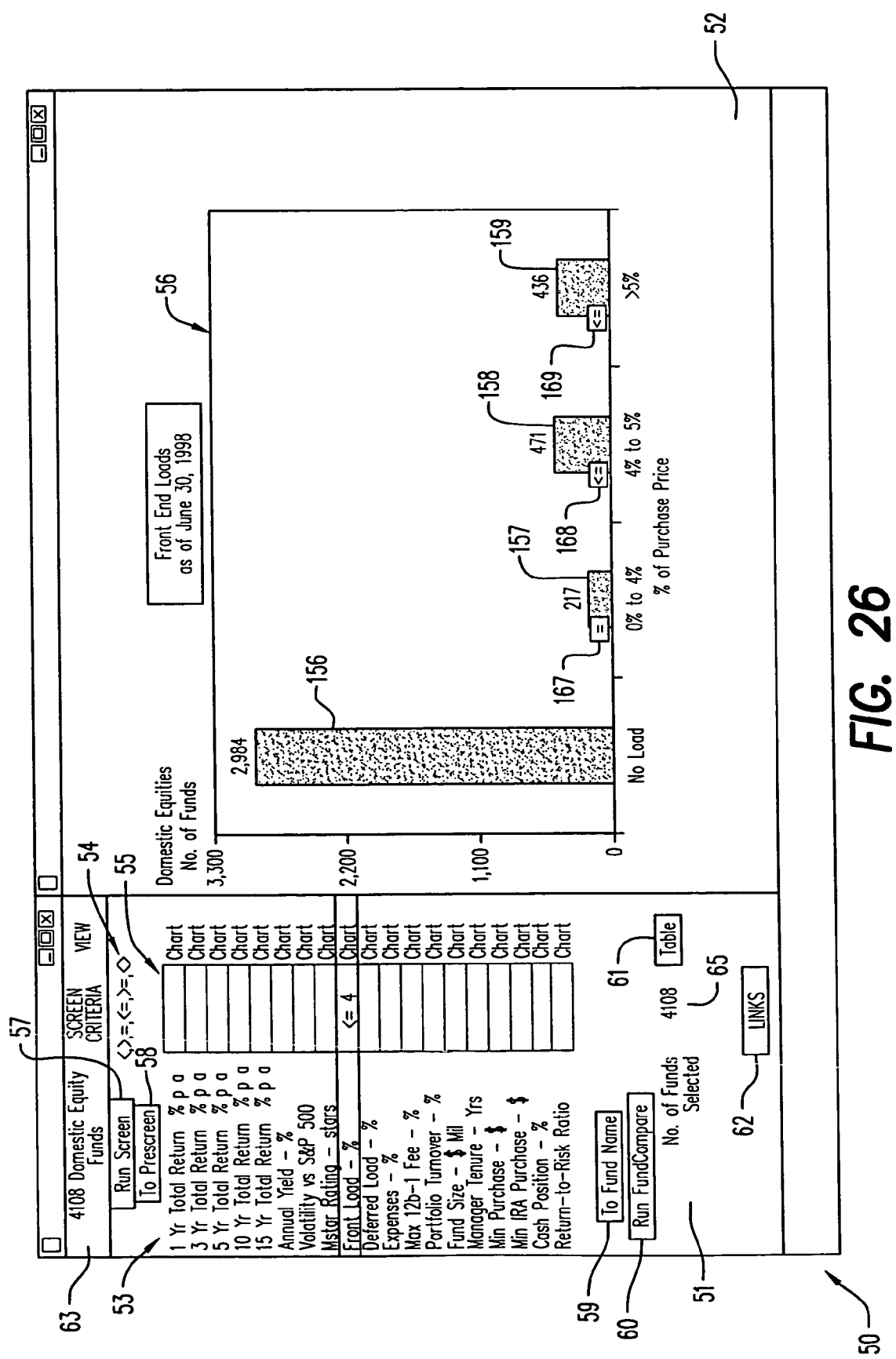
FIG. 26 is a viewing screen layout of a split screen display for an alternative embodiment for user selection of a parameter limiter for still another selected investment parameter.

In FIGS. 24 through 26 there is shown a short cut technique for user selection of a parameter limiter for a selected investment parameter.

FIG. 24 shows in display area 52 for investment parameter 5 YR Total Return a histogram 56 that has a plurality of frequency of occurrence category display elements shown as bars 156, 157, 158, 159 and 160. Associated with bars 157, 158, 159 and 160 are a plurality of limiter actuators 167, 168, 169 and 170, respectively. Assigned to each limiter actuator 167 through 170 is a parameter limiter, greater than, as illustrated by the symbol ">" shown in each of the limiter actuator boxes 167 through 170. This assignment is made as a matter of design choice. For example, the assignment may be based on the limiter that the user is expected to make for the selected investment parameter.

Each limiter actuator 167 through 170 is disposed on viewing screen 50 in proximity to a number associated with the corresponding display element. Thus, of the two numbers in the phrase, "15% to 18%", for display element 158, limiter actuator 168 is in proximity to the nearest of the two numbers, 15. To select ">15" as a parameter limiter for the 5 YR Total Return investment parameter, the user operates computer input devices 48 to select limiter actuator 168 which automatically inserts ">15" in the box 55 associated with the 5 YR Total Return investment parameter as shown in FIG. 24.

FIG. 25 shows a viewing screen upon which is presented histogram 56 for the Volatility vs. S&P 500 investment parameter. Histogram 56 has display elements 156 through 161. Limiter actuators 167 through 171 are presented in association with display elements 157 through 161, respectively. As shown in FIG. 25, the parameter limiter, "<=" is assigned to each of limiter actuators 167 through 171. To select "<=0.75" as a parameter limiter for the Volatility vs. S&P 500 investment parameter, the user operates computer input devices 48 to select limiter actuator 168 which automatically inserts "<=0.75" in the box 55 associated with the Volatility vs. S&P 500 investment parameter as shown in FIG. 25.

FIG. 26 shows a viewing screen upon which is presented histogram 56 for the Front End Loads investment parameter. Histogram 56 has display elements 156 through 159. Limiter actuators 167 through 169 are presented in association with display elements 157 through 159, respectively. As shown in FIG. 26, the parameter limiter, "=" is assigned to limiter actuator 167 and the parameter element "<=" is assigned to each of limiter actuators 168 and 169. To select "<=4" as a parameter limiter for the Front End Loads investment parameter, the user operates computer input devices 48 to select limiter actuator 168 which automatically inserts "<=4" in the box 55 associated with the Front End Loads investment parameter as shown in FIG. 26.

Figure 21:
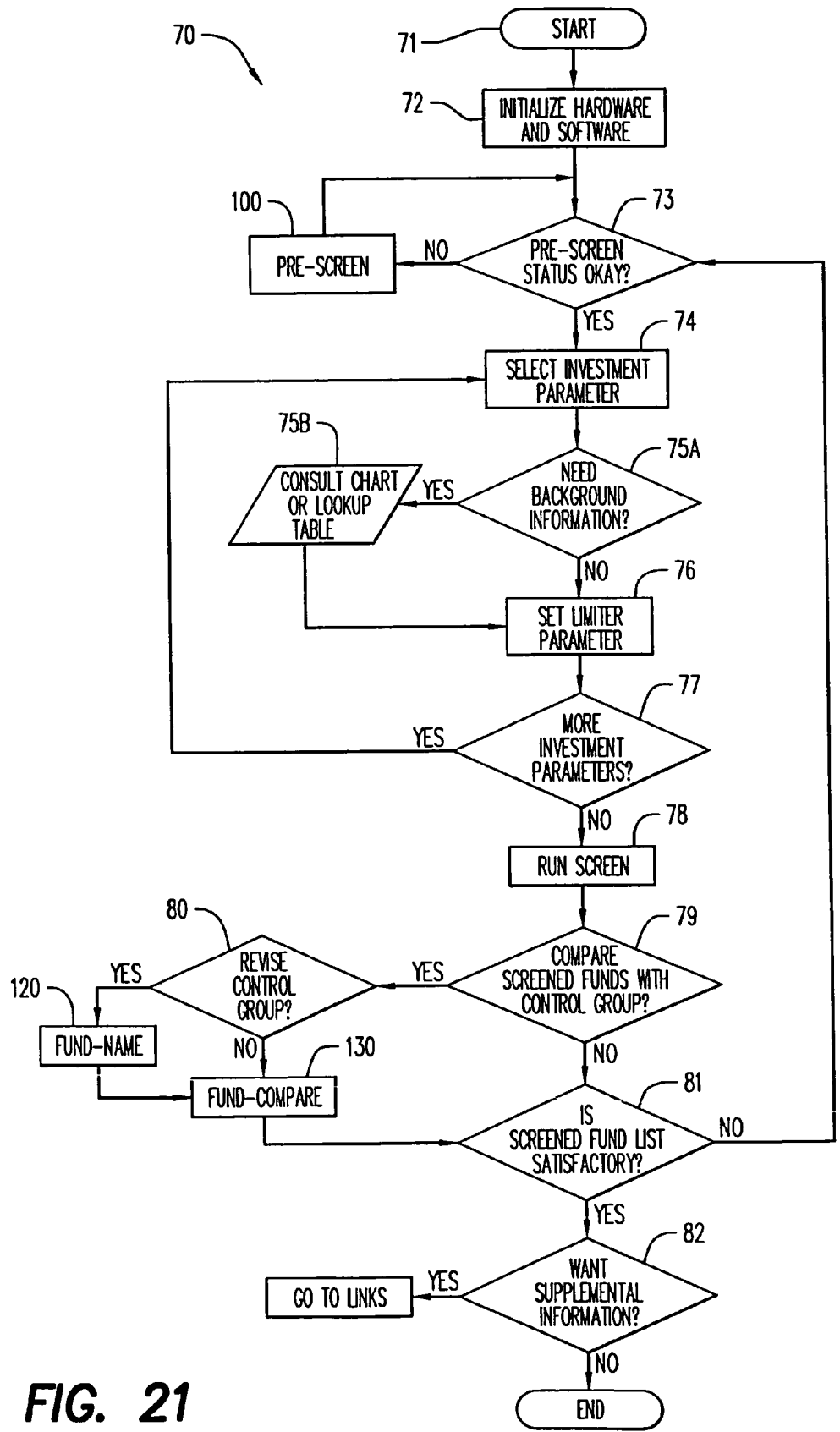
FIG. 21 is a flow diagram of the investment selection program of the FIG. 1 system.
Figure 22:
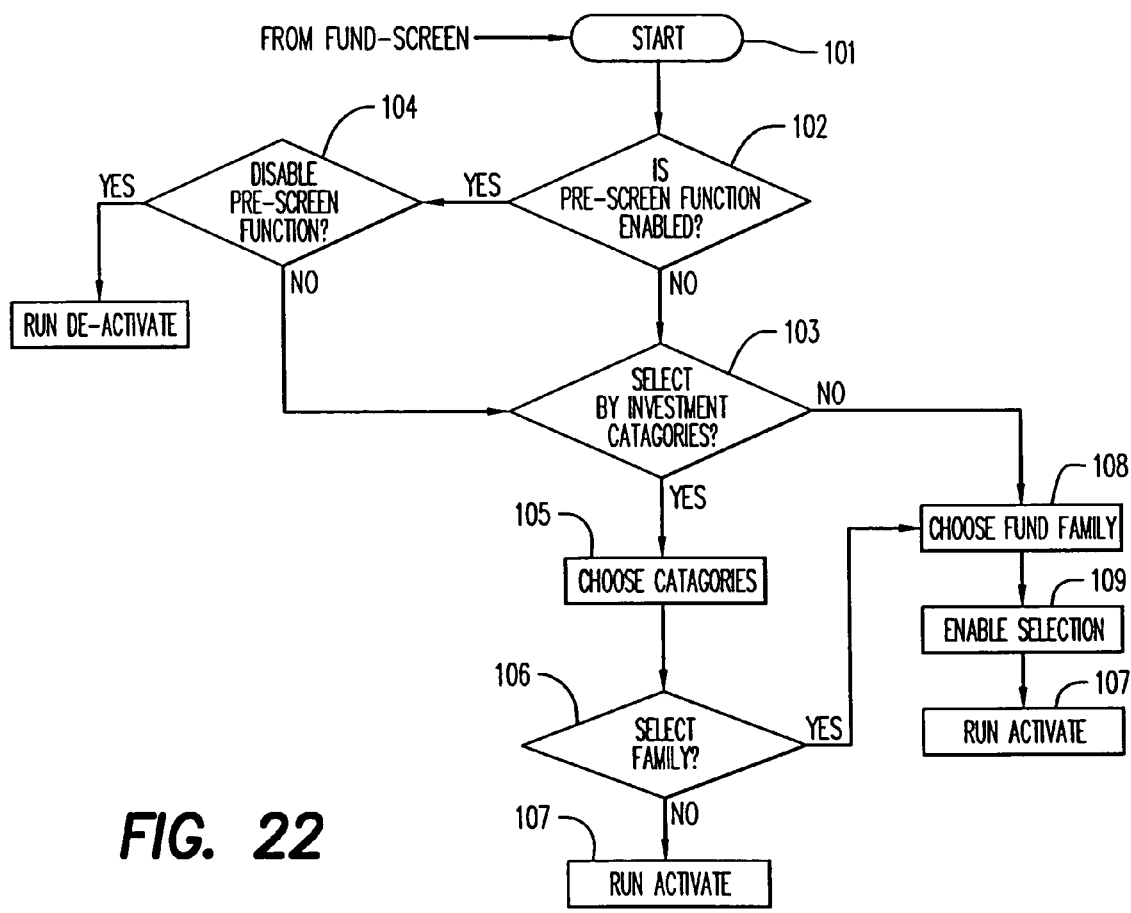
FIG. 22 is a flow diagram of the PreScreen filter of FIG. 21.
Figure 23:
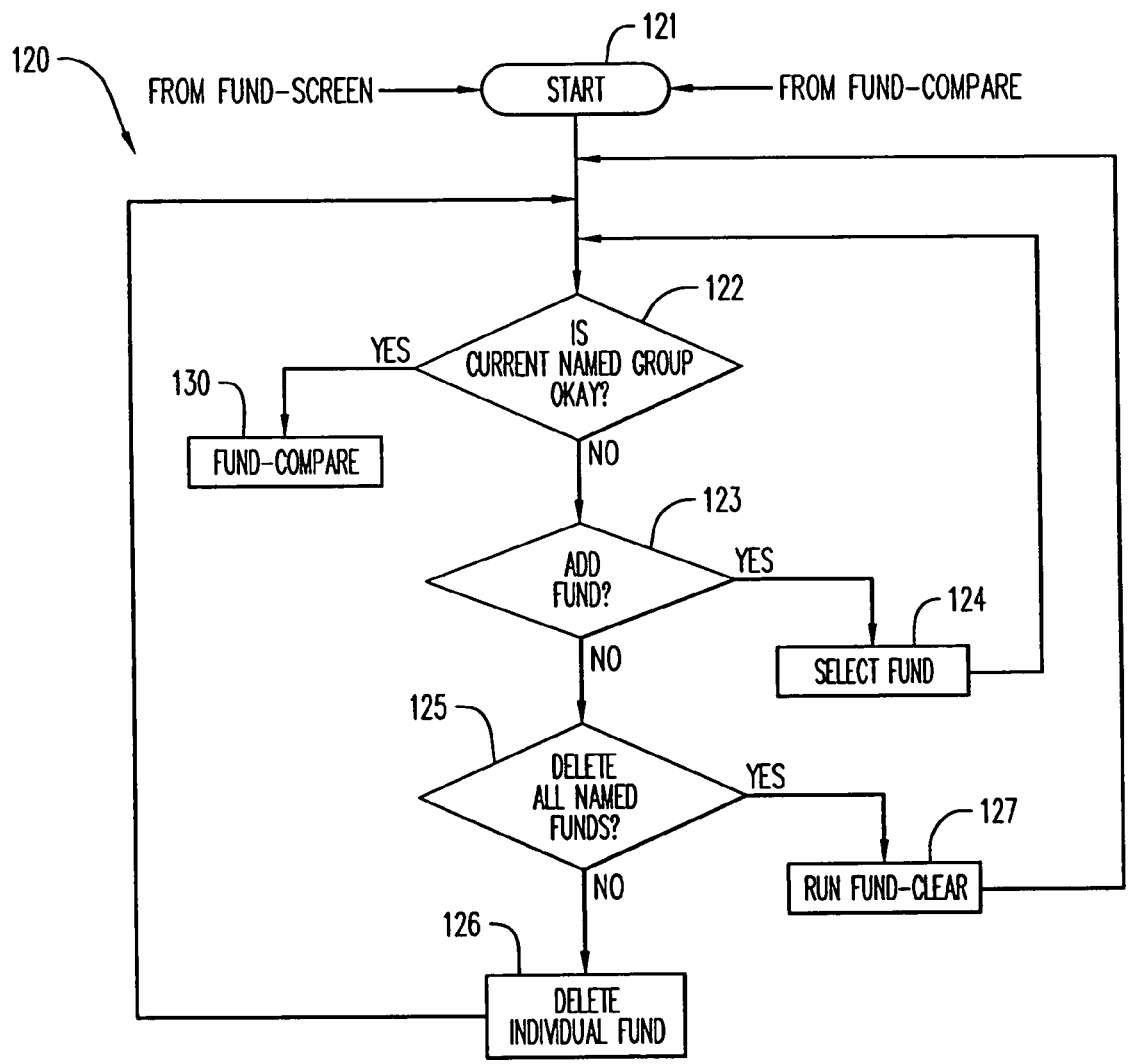
FIG. 23 is a flow diagram of the FundName feature of the FIG. 21 program.

Security search procedure 42B is shown in FIGS. 21 through 23 as having a Fundscreen portion 70, a PreScreen portion 100, a FundName portion 120 and a FundCompare portion 130.

Fundscreen portion 70 is initiated by user selection of security search procedure 42B from a menu of applications stored in computer 41. When so selected, Fundscreen is entered via a start box 71. Control passes to initializing box 72 which serves to initialize the hardware and software of computer 41 for configuring processor 43, memory 42, memory access device 44, display 47, and computer input devices 48 as a filter. This will enable the presentation on viewing screen 50 in FIG. 2 of the split screen with the control data in display area 51.

After initialization, Fundscreen 70 enters a PreScreen status box 73. In the preferred embodiment, PreScreen 100 is an optional feature that may or may not be used by the user. PreScreen status is a PreScreen filter condition that is either a default filter condition or the filter condition used for the last performed filter process. If such filter condition is acceptable, the status is okay.

Figure 3:
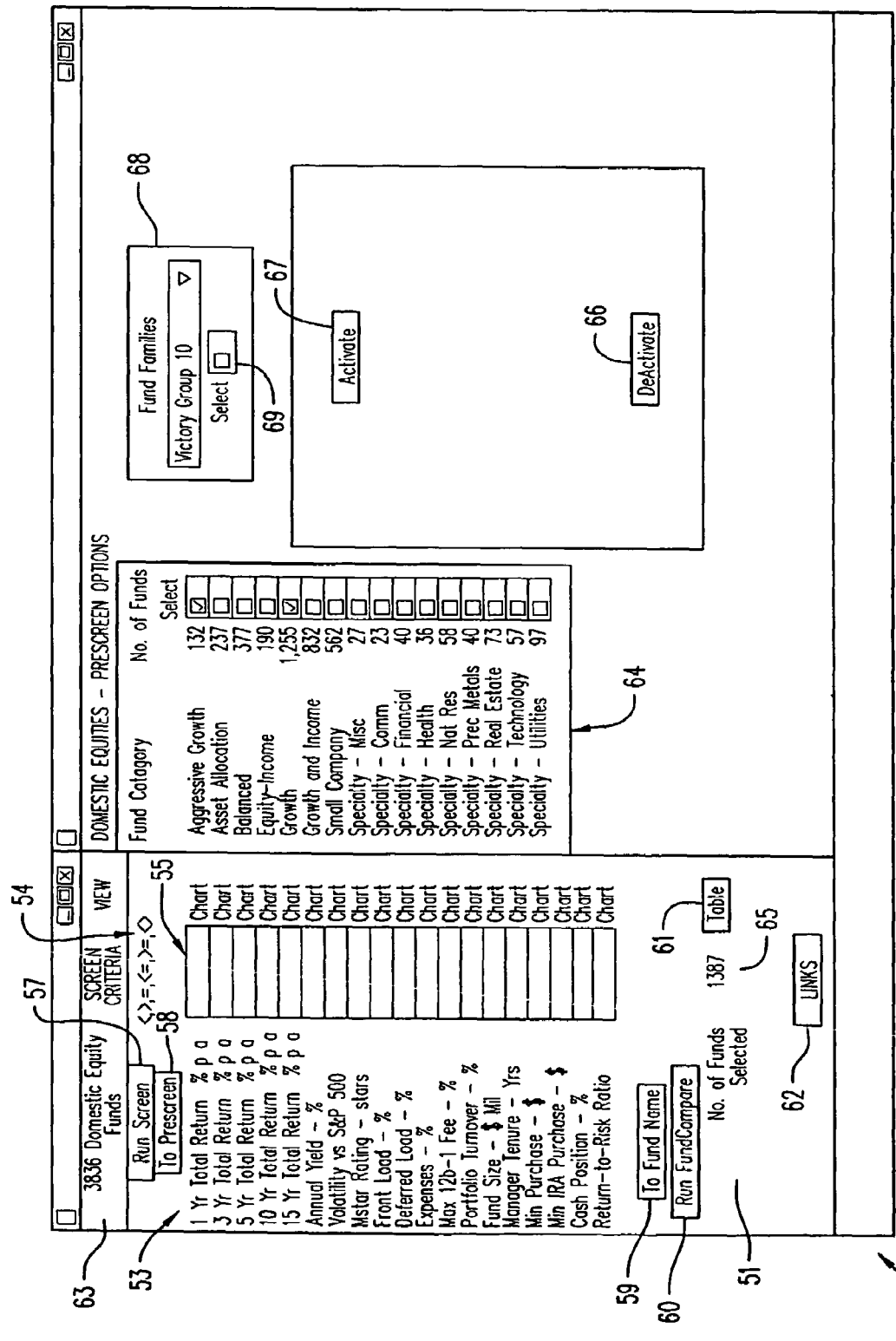
FIG. 3 is a viewing screen layout of a split screen display for user selection of PreScreen filter parameters for a first filter pass.

If PreScreen status is not okay (user desires a different PreScreen filter condition), the user can select PreScreen button 58 of FIG. 2. Control passes to PreScreen box 100. Referring to FIGS. 3 and 22, PreScreen 100 is entered via start box 101 to PreScreen enabled box 102. At this point, the PreScreen fund category data is displayed on display area 52 of viewing screen 50. PreScreen 100 now awaits user selection of deactivate button 66, investment categories and/or fund families.

If the user decides at this point not to use the PreScreen filter option, deactivate button 66 is selected by operation of computer input devices 48 as indicated at a disable PreScreen function box 104. PreScreen 100 then will deactivate and return control to Fundscreen 70.

On the other hand if a PreScreen filter operation is to be used, control passes to a select by investment categories box 103. If the user decides to select categories of investment, control passes to a choose categories box 105. The user now selects one or more fund categories from the list 64 in FIG. 3 by operation of computer input devices 48. Control then passes to a select family box 106. If the user decides not to select a family, he actuates activate button 67 (FIG. 3) and the chosen categories are run as a PreScreen filter at run activate box 107. Control is then returned to Fund Screen.

If the user had decided at select family box 106 to select a fund family, control passes to a choose fund family box 108. Control also passes to choose fund family box 108 if the user decides at select by investment categories box 103 not to select a category. The user now selects a fund family from the list at 68 (FIG. 3) by operating computer input devices 48. Control then passes to an enable selection box 109 that registers the selected fund family. The user then actuates activate button 67 (FIG. 3) and the chosen categories (if any) and the selected fund family are run as a PreScreen filter at run activate box 107. Control is then returned to Fund Screen.

Referring again to FIG. 21, control is returned from PreScreen to box 73. Assuming user satisfaction with the PreScreen status, control will pass to box 74. At this point, the user can form a proposed filter condition for the next filter pass by selecting an investment parameter 53. The user may now choose to view background information as at boxes 75A and 75B. This is accomplished at Box 75B by operation of the Table button 61 (FIG. 2). This will cause the spreadsheet of investment parameters to be displayed for all funds remaining in the search.

Control then passes to Box 76. The user can now select a parameter limiter to limit the investment parameter. The limiter will be displayed in criteria boxes 55 of display area 51. For example, In FIG. 5 limiter ">18", is displayed in criteria box 55 for investment parameter 5 Yr Total Return. When a proposed filter condition is acceptable, the user operates the Run Screen button 57 (FIG. 2). This executes the filter pass. This results in new charts being generated for each investment parameter based on all filter passes performed so far in the filtering sequence.

Control then passes to box 77 for decision as to the need for any more investment parameters for this filter pass. If yes, control is returned to box 74 for selection of another investment parameter under the control of boxes 74 through 77. If no, control passes to box 78 which executes the filter pass when the user operates the Run Screen button 57.

Control passes to box 79 for a decision as to whether the filtered fund set is to be compared with a control group of funds that can be user selected by fund name.

If the user does not want to use the control group features of FundName 120 or FundCompare 130, control passes to box 81. Box 81 is a decision operation that allows the user to make a final determination whether the fund search results are satisfactory. If no, control is returned to box 73 for another filter pass. FIGS. 6 through 20 show charts for selected multiple investment parameters 53 and parameter limiters 54. If yes, control passes to decision box 82.

At decision box 82, the user needs to decide if additional information is desired from other resources. If no, the fund search is over as signified by end box 83. If yes, control is passed via a Links feature 84 that permits linkage to other data bases 46 (FIG. 1).

If the user chooses to use the control group feature at box 79, To FundName button 59 (FIG. 2) is activated. Control passes to box 80 for a user decision as to whether to revise the control group. The control group is a group of funds selected by the user for comparison with the filtered set of funds provided by the fund search. The control group is displayed to the user. If the control group is satisfactory, control passes to FundCompare 130.

If it is desired to alter the control group, control passes to FundName 120. Referring to FIG. 23, FundName is entered at start box 121 from either Fundscreen 70 or FundCompare 130. Control passes to box 122 for a decision as to whether the current control group is okay. If so control is passed to FundCompare 130. If not, control passes to boxes 123 through 127 for changing the control group by adding or deleting funds.

At box 123, if the user wants to add a fund, control passes to box 124 where the user is enabled to add a fund by using computer input devices 48 to select funds by name from a displayed list for addition to the control group. Control is then returned to box 122.

At Box 123, if the user wants to delete funds, control passes to box 125. If the user wants to delete all funds from the control group, control passes to box 127. The user is then enabled to operate a Run FundClear button that is displayed with the control group of funds. Box 127 respond by deleting all funds from the control group. Control then returns to box 122.

If the decision at box 125 is no, control passes to decision box 126 for a user decision to delete a single fund. If yes, the user selects the fund on the displayed list and operates a delete fund button also displayed with the control group list. This acts to delete the selected fund and return control to box 122. Control continues to circulate in the loop formed by boxes 122 through 126 until the current control group is okay at box 122. When this happens, control is passed to the Fund Compare box 130 (FIGS. 21 and 23).

The FundCompare box serves to compare the filtered funds with the funds of the control group in detail or in summary fashion.

Security search procedure 42B can be stored in the internal memory of computer 41. Alternatively, security search procedure 42B can be a memory media, such as a memory disc or other storage device that is arranged to control computer 41, display device 47 and computer input devices 48 to search the universe of funds. In this form of the invention, the memory media includes:

(a) means for configuring computer system 40 into a filter for performing filter passes through a security data base;

(b) means for controlling the filter to present on the viewing screen the pluralities of investment parameters and of parameter limiters that are selectable by user operation of computer input devices 48 to form a proposed filter condition;

(c) means for controlling the filter to present on the viewing screen a histogram showing the population of the funds in different frequency of occurrence categories for a proposed filter condition of the $i^{th}$ one of said filter passes. The proposed filter condition includes (i) at least one criteria for one or more of said investment parameters selected by user operation of computer input devices 48 and (ii) all filter conditions for previously performed ones of the filter passes;

(d) means for controlling the filter to execute the proposed or $i^{th}$ filter pass in response to a run command generated by user operation of computer input devices 48;

(e) means for causing means (b), means (c) and means (d) to repeat until the $n^{th}$ filter pass has been performed; and (f) optional means for combining the n filter passes with PreScreen 100 or other investment category filter.

In a preferred embodiment of the memory media invention, investment parameters 53 and parameter limiters 54 are presented in area 51 of the viewing screen and histogram 56 is presented in area 52 of the viewing screen.

The present invention having been thus described with particular reference to the preferred forms thereof, it will be obvious that various changes and modifications may be made therein without departing from the spirit and scope of the present invention as defined in the appended claims.

What is claimed is:

1. A method of searching a universe of financial instruments by performing n filter passes of said universe with a computer having a processor, a memory, a viewing screen and a computer input device, each said filter pass having a filter condition, said method comprising:

configuring said computer based on a search procedure to perform steps comprising:

(a) displaying on said viewing screen a plurality of filter criteria, at least one of said filter criteria being selectable by user operation of said computer input device as a proposed filter condition of an $i^{th}$ filter pass, where i is any integer from 1 to n, said proposed filter condition including (a) said at least one filter criteria selected by user operation of said computer input device and (b) all filter conditions for previously performed ones of said filter passes;

(b) in response to a selection of said at least one filter criteria, filtering said universe of financial instruments based on said proposed filter condition to provide a proposed filter output;

(c) displaying on said viewing screen a histogram based upon said proposed filter output, wherein said histogram includes an ordinate and an abscissa, one of which represents a number of financial instruments and the other of which represents frequency of occurrence categories of said financial instruments;

(d) if said user makes an additional filter criteria selection to provide a modified proposed filter output, repeating steps (b) and (c) based on said modified proposed filter output, wherein said histogram is modified based on said modified proposed filter output;

(e) executing said $i^{th}$ filter pass based on said proposed filter output or said modified proposed filter output in response to a run command generated by user operation of said computer input device; and (f) repeating steps (b), (c), (d) and (e) until the $n^{th}$ filter pass has been performed.

2. The method according to claim 1, wherein steps (a) and (c) concurrently present said filter criteria and said histogram on said viewing screen.

3. The method according to claim 2, wherein said filter criteria comprise a plurality of investment parameters and at least one parameter limiter, said parameter limiter being user selectable to limit a selected investment parameter in forming said proposed filter condition.

4. The method according to claim 3, wherein said parameter limiter is one of a plurality of parameter limiters.

5. The method according to claim 4, wherein said plurality of investment parameters and said plurality of parameter limiters are presented in a first area of said screen and said histogram is presented in a second area of said screen.

6. The method according to claim 5, wherein said n filter passes are combined with an additional filter pass that has filter conditions selected from a plurality of investment categories for said financial instruments.

7. The method of claim 1, wherein the population chart for the $i^{th}$ filter pass differs from the population chart for the $i^{th}-1$ filter pass.

8. A memory media that is capable of controlling a computer to search a universe of financial instruments by performing n filter passes of said universe, said computer having a viewing screen and a computer input device, each said filter pass employing a filter condition, said memory media comprising:

a search procedure that is capable of controlling said computer to perform the following steps:

(a) displaying on said viewing screen a plurality of filter criteria, said filter criteria being selectable by user operation of said computer input device as a proposed filter condition of an $i^{th}$ filter pass, where i is an integer from 1 to n, said proposed filter condition including (i) at least one investment parameter selected by user operation of said computer input device and (ii) all filter conditions for previously performed ones of said filter passes;

(b) in response to a selection of said at least one filter criteria, filtering said universe of financial instruments based on said proposed filter condition to provide a proposed filter output;

(c) displaying on said viewing screen a histogram based upon said proposed filter output, wherein said histogram includes an ordinate and an abscissa, one of which represents a number of financial instruments and the other of which represents frequency of occurrence categories of said financial instruments;

(d) if said user makes an additional filter criteria selection to provide a modified proposed filter output, repeating steps (b) and (c) based on said modified proposed filter output, wherein said histogram is modified based on said modified proposed filter output;

(e) executing said $i^{th}$ filter pass based on said proposed filter output or said modified proposed filter output in response to a run command generated by user operation of said computer input device; and (f) repeating steps (b), (c), (d) and (e) to repeat until the $n^{th}$ filter pass has been performed.

9. A memory media according to claim 8, wherein said filter criteria comprise a plurality of investment parameters and at least one parameter limiter, said parameter limiter being user selectable to limit a selected investment parameter in forming said proposed filter condition.

10. The memory media according to claim 9, wherein said parameter limiter is one of a plurality of parameter limiters.

11. The computer media according to claim 10, wherein said plurality of investment parameters and said plurality of parameter limiters are displayed in a first area of said viewing screen and said histogram is displayed in a second area of said viewing screen.

12. The computer media according to claim 11, wherein said n filter passes are combined with an additional filter pass that has a filter condition selected from a plurality of investment categories for said financial instruments.

13. The memory media of claim 8, wherein the population chart for the $i^{th}$ filter pass differs from the population chart for the $i^{th}-1$ filter pass.

14. A method of searching a universe of financial instruments with a computer that includes a processor, a memory, a viewing screen and a computer input device, said method comprising:

configuring said computer based on a search procedure to perform steps comprising:

(a) displaying on said viewing screen a plurality of investment parameters;

(b) in response to a user selecting at least one of said investment parameters, displaying on said viewing screen a histogram including an ordinate and an abscissa, one of which represents a number of said financial instruments and the other of which includes a plurality of display elements that represent different frequency of occurrence groupings of a selected one of said investment parameters, wherein each of said display elements has a filter condition associated therewith and an actuator for selecting said filter condition displayed at a location in said histogram;

(c) in response to a user selecting at least one of said filter conditions by actuating the associated actuator, filtering said universe of financial instruments to provide a filter output; and (d) displaying on said viewing screen a modified histogram based on said filter output.

15. The method of claim 14, wherein the filter condition and associated actuator is presented in close proximity to the associated display element.

16. The method of claim 14, wherein said filter condition is a parameter limiter.

* * * * *